United States Patent [19]
Kanehara et al.

[11] Patent Number: 5,427,579
[45] Date of Patent: Jun. 27, 1995

[54] CONTROL SYSTEM FOR BELT-TYPE CONTINUOUSLY VARIABLE TRANSMISSION

[75] Inventors: Shigeru Kanehara; Hideo Koyama, both of Tokyo; Toru Fujii; Takemasa Kurokawa, both of Kyoto, all of Japan

[73] Assignee: Honda Giken Kogyo Kabushiki Kaisha, Tokyo, Japan

[21] Appl. No.: 129,712

[22] Filed: Sep. 30, 1993

[30] Foreign Application Priority Data

Sep. 30, 1992 [JP] Japan .................................. 4-285526

[51] Int. Cl.⁶ .............................................. F16H 59/00
[52] U.S. Cl. ......................................... 474/28; 474/69
[58] Field of Search ................... 474/8, 11, 12, 17, 18, 474/28, 69, 70

[56] References Cited

U.S. PATENT DOCUMENTS

| | | | |
|---|---|---|---|
| 5,169,366 | 12/1992 | Reniers | 474/28 |
| 5,183,439 | 2/1993 | Yumoto et al. | 474/28 |
| 5,273,492 | 12/1993 | Kashiwase et al. | 474/28 X |

OTHER PUBLICATIONS

English language of Japanese Abstract 62-196447; Aug. 1987.

*Primary Examiner*—Michael Powell Buiz
*Attorney, Agent, or Firm*—Lyon & Lyon

[57] ABSTRACT

A belt-type continuously variable transmission has a drive pulley coupled to an input shaft, a driven pulley coupled to an output shaft, a V-belt trained around the drive and driven pulleys, a drive-pulley cylinder for varying the pulley width of the drive pulley, and a driven-pulley cylinder for varying the pulley width of the driven pulley. The belt-type continuously variable transmission is controlled by a control system including a high-pressure regulator valve for producing high-pressure control oil under a high control pressure, a low-pressure regulator valve for producing low-pressure control oil under a low control pressure which is lower than the high control pressure, a shift valve for selectively supplying the high-pressure control oil and the low-pressure control oil to the drive-pulley cylinder and the driven-pulley cylinder, and a shift controller for controlling the shift valve to move in a direction to eliminate an difference between a target speed ratio control value and a present speed ratio control value from a reference position in which an axial thrust force ratio between an axial thrust force required to be applied by the drive-pulley cylinder and an axial thrust force required to be applied by the driven-pulley cylinder to keep a present speed ratio i constant.

6 Claims, 24 Drawing Sheets

Coefficient of traction λ

Speed ratio i

CONTROL SYSTEM FOR BELT-TYPE CONTINUOUSLY VARIABLE TRANSMISSION

BACKGROUND OF THE INVENTION

1. Field of the Invention

The present invention relates to a control system for controlling a belt-type continuously-variable transmission, and more particularly to a control system for controlling the speed ratio of a belt-type continuously variable transmission which is hydraulically operated to control the speed ratio through a four-way valve.

2. Description of the Prior Art

Belt-type continuously variable transmissions have drive and driven pulleys each having a variable pulley width and a metallic V-belt trained around the drive and driven pulleys. Such belt-type continuously variable transmissions are finding increasing use as motor vehicle transmissions. To control the speed ratio of the belt-type continuously variable transmissions, the hydraulic pressure of working oil supplied to a hydraulic cylinder for setting the pulley width of the drive pulley and also the hydraulic pressure of I working oil supplied to a hydraulic cylinder for setting the pulley width of the driven pulley, i.e., the axial thrust force of the pulleys, are controlled to vary the pulley widths of the pulleys.

Heretofore, it has been customary to supply the hydraulic cylinder combined with the driven pulley with a hydraulic pressure that is required to keep the belt under tension and also to supply the hydraulic cylinder combined with the drive pulley with working oil which has such a hydraulic pressure through a flow control valve for controlling the speed ratio. The pulley width of the drive pulley is controlled by the supplied working oil. Since the hydraulic pressure varies depending on the speed ratio and the input torque of the transmission, the rate at which the speed ratio is controlled (speed ratio control rate) is affected by the speed ratio and the input torque of the transmission.

It has been known to employ a four-way valve to supply working oil to one of cylinders combined with respective drive and driven pulleys and discharge working oil from the other cylinder for controlling the speed ratio of a belt-type continuously variable transmission. For example, Japanese laid-open patent publication No. 62-196447 discloses a transmission control apparatus for controlling the speed ratio of a belt-type continuously variable transmission. In the disclosed transmission control apparatus, a first line pressure regulated by a first pressure regulating valve and a second line pressure, lower than the first line pressure, regulated by a second pressure regulating valve are supplied selectively to the cylinders combined with the respective drive and driven pulleys through the four-way valve. Due to the difference between the first and second line pressures, one of the cylinders is supplied with the working oil, whereas the other cylinder discharges the working oil.

According to the disclosed control process, a control value is determined to obtain a hydraulic pressure Pin' in the cylinder combined with the drive pulley in order to generate an axial thrust force for achieving a target speed ratio, and the first line pressure is determined by adding a corrective hydraulic pressure $\Delta P1$ to the hydraulic pressure Pin'. If the corrective hydraulic pressure $\Delta P1$ is reduced, then the constant state deviation is increased, resulting in a larger difference between the present speed ratio and the target speed ratio, so that the speed ratio cannot be controlled accurately. Conversely, if the corrective hydraulic pressure $\Delta P1$ is increased, then the steady state deviation is reduced (though it cannot be reduced to zero), but the first line pressure may unnecessarily become high, resulting in a large power loss.

Another problem is that inasmuch as the corrective hydraulic pressure $\Delta P1$ affects the speed ratio control rate, if the corrective hydraulic pressure $\Delta P1$ is reduced, then the speed ratio control rate is lowered, and hence the response of the speed ratio control is also lowered. Conversely, if the corrective hydraulic pressure $\Delta P1$ is reduced, then the speed ratio control rate is increased. However, the controlled speed ratio tends to overshoot the target speed-ratio, and the speed ratio control suffers hunting.

Proportional plus integral (PI) control or proportional pulse integral plus derivative (PID) control processes may be introduced to prevent the overshooting and eliminate the constant state deviation. However, such PI or PID control processes take a relatively long period of time until the speed ratio reaches the target speed ratio, and hence lowers the speed ratio control response.

SUMMARY OF THE INVENTION

It is therefore an object of the present invention to provide a control system for controlling the speed ratio of a belt-type continuously variable transmission with a good response and as small a constant state deviation as possible.

According to the present invention, there is provided a system for controlling a belt-type continuously variable transmission having a drive pulley coupled to an input shaft, a driven pulley coupled to an output shaft, a V-belt trained around the drive and driven pulleys, a drive-pulley cylinder for varying the pulley width of the drive pulley, and a driven-pulley cylinder for varying the pulley width of the driven pulley. The system comprises a high-pressure regulator valve for producing high-pressure control oil under a high control pressure PH, a low-pressure regulator valve for producing low-pressure control oil under a low control pressure PL which is lower than the high control pressure PH, a shift valve for selectively supplying the high-pressure control oil and the low-pressure control oil to the drive-pulley cylinder and the driven-pulley cylinder, and shift control means for controlling the shift valve. The shift control means controls the shift valve so as to move in a direction to eliminate a deviation or difference between a target speed ratio control value and a present speed ratio control value from a reference position in which an axial thrust force ratio $\gamma$ between an axial thrust force $Q_{DR}$ required to be applied by the drive-pulley cylinder and an axial thrust force $Q_{DN}$ required to be applied by the driven-pulley cylinder to keep a present speed ratio constant.

The V-belt may comprise a plurality of metallic members connected as an endless ring-shaped belt by a belt strap, whereby each of the metallic members can push an adjacent one of the metallic members to transmit drive forces from the drive pulley to the driven pulley when the drive pulley is rotated by the input shaft.

When a speed ratio control command is issued, the position of the shift valve where the axial thrust force ratio $\gamma(=Q_{DR}/Q_{DN})$ required for constant travel with the speed ratio at the time is achieved is set as a reference position. The shift valve is then controlled from the reference position to eliminate the difference between the target speed ratio control value and the present speed ratio control value.

At the time the speed ratio control process is started and also in transient conditions, the transmission can be controlled to optimize the axial thrust forces of the drive and driven pulleys. Inasmuch as the shift valve position where the axial thrust force ratio required for constant travel with the speed ratio at the time is achieved is set as a reference position, almost no steady state deviation is caused.

Since the control value is outputted to eliminate the difference between the target speed ratio control value and the present speed ratio control value, it is possible to control the speed ratio to approach a target value quickly when the difference is large, and also to control the speed ratio to approach a target value slowly when the difference is small. Accordingly, the speed ratio control process can be carried out at an optimum speed ratio control rate.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
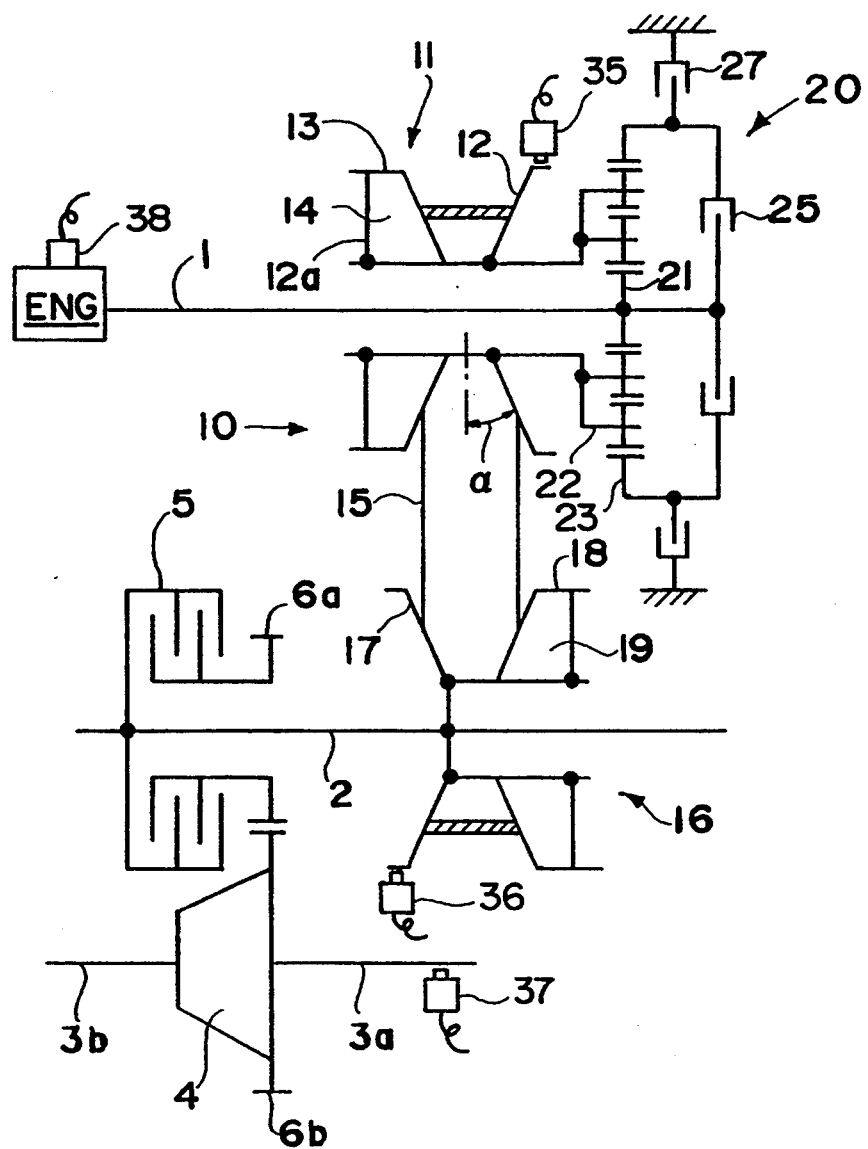
FIG. 1 is a schematic view showing in skeleton form a V-belt-type continuously variable transmission controlled by a control system according to the present invention.

As shown in FIG. 1, a V-belt-type continuously variable transmission, suitable for use as a motor vehicle transmission, controlled by a control system according to the present invention is mounted on a motor vehicle such as an automobile. The V-belt-type continuously variable transmission comprises a metallic V-belt mechanism 10 disposed between an input shaft 1 directly coupled to the output shaft of an engine ENG and a countershaft 2 extending parallel to the input shaft 1, a planetary-gear forward-reverse selector mechanism 20 disposed between the input shaft 1 and a drive pulley 11, and a starter clutch 5 disposed between the countershaft 2 and output shafts 3a, 3b.

The metallic V-belt mechanism 10 comprises a drive pulley 11 mounted on the input shaft 1, a driven pulley 16 mounted on the countershaft 2, and a metallic V-belt 15 trained around the drive and driven pulleys 11, 18. The metallic V-belt 15 comprises a plurality of metallic members joined as an endless ring-shaped belt by a metallic belt strap. With the metallic V-belt 15 trained around the drive and driven pulleys 11, 16, when the drive pulley 11 is rotated by the engine ENG, the input shaft i rotates the drive pulley 11, causing each of the metallic members to push the forward metallic member thereby to transmit drive forces from the drive pulley 11 to the driven pulley 16, which rotates the countershaft 2.

The drive pulley 11 comprises an axially fixed pulley member 12 rotatably mounted on the input shaft 1, and a pulley member 13 axially movable relatively to the fixed pulley member 12. The pulley member 13 has a cylinder chamber 14 defined axially laterally thereof by a cylinder wall 12a coupled to the fixed pulley member 12. When a hydraulic pressure is supplied to the cylinder chamber 14, it generates a lateral pressure for moving the pulley member 13 axially toward the fixed pulley member 12.

The driven pulley 16 comprises a fixed pulley member 17 fixedly mounted on the countershaft 2, and a pulley member 18 axially movable relatively to the fixed pulley member 17. The pulley member 18 has a cylinder chamber 19 defined axially laterally thereof by a cylinder wall 17a coupled to the fixed pulley member 17. When a hydraulic pressure is supplied to the cylinder chamber 19, it generates a lateral pressure for moving the pulley member 18 axially toward the fixed pulley member 17.

Therefore, when the hydraulic pressures (pulley control hydraulic pressures) supplied to the cylinder chambers 14, 19 are controlled, the pulley widths of the pulleys 11, 18 can be varied to change the diameters of circles around which the V-belt 15 is trained on the pulleys 11, 16 for continuously varying the speed ratio.

The planetary-gear forward-reverse selector mechanism 20 comprises a sun gear 21 coaxially coupled to the input shaft 1, a carrier 22 coupled to the fixed pulley member 12 and supporting planet gears meshing with the sun gear 21, a ring gear 23 that can be held against rotation by a reverse brake 27 and is held in mesh with the planet gears, and a forward clutch 25 capable of connecting the sun gear 21 and the ring gear 23 to each other. When the forward clutch 25 is engaged, the sun gear 21, the planet gears on the carrier 22, and the ring gear 23 rotate in unison with the input shaft 1, causing the drive pulley 11 to rotate in the same direction as the input shaft 1 (forward direction). When the reverse brake 27 is engaged, the ring gear 23 is held against rotation, and hence the carrier 22 is rotated in a direction opposite to the sun gear 21, so that the drive pulley 11 rotates in a direction opposite to the input shaft i (reverse direction). The driven pulley 16 and hence the countershaft 2 are rotated in the same direction as the drive pulley 11 by the metallic V-belt 15.

The starter clutch 5 serves to allow the power to be transmitted from, or prevent the power from being transmitted from, the countershaft 2 to the output shafts 3a, 3b. When the starter clutch 5 is engaged, it connects the countershaft 2 to the output shafts 3a, 3b, allowing the power to be transmitted from the countershaft 2 to the output shafts 3a, 3b. Therefore, when the starter clutch 5 is engaged, the output power of the engine ENG is transmitted, at a speed ratio determined by the metallic V-belt mechanism 10, from the countershaft 2 through meshing gears 6a, 6b to a differential mechanism 4, from which it is divided and transmitted to the output shafts 3a, 3b that are connected to road wheels (not shown). When the starter clutch 5 is disengaged, no such engine output power can be transmitted, and hence the transmission is in a neutral condition.

The V-belt-type continuously variable transmission has various sensors for detecting control signals for the control of the speed ratio. These sensors include, for example, a first speed sensor 35 for detecting the rotational speed Ndr of the drive pulley 11, a second speed sensor 36 for detecting the rotational speed Ndn of the driven pulley 16, a third speed sensor 37 for detecting the vehicle speed V based on the rotational speed of the output shaft 3a, and a throttle opening sensor 38 for detecting the throttle opening (accelerator opening) of the engine ENG.

Figure 2:
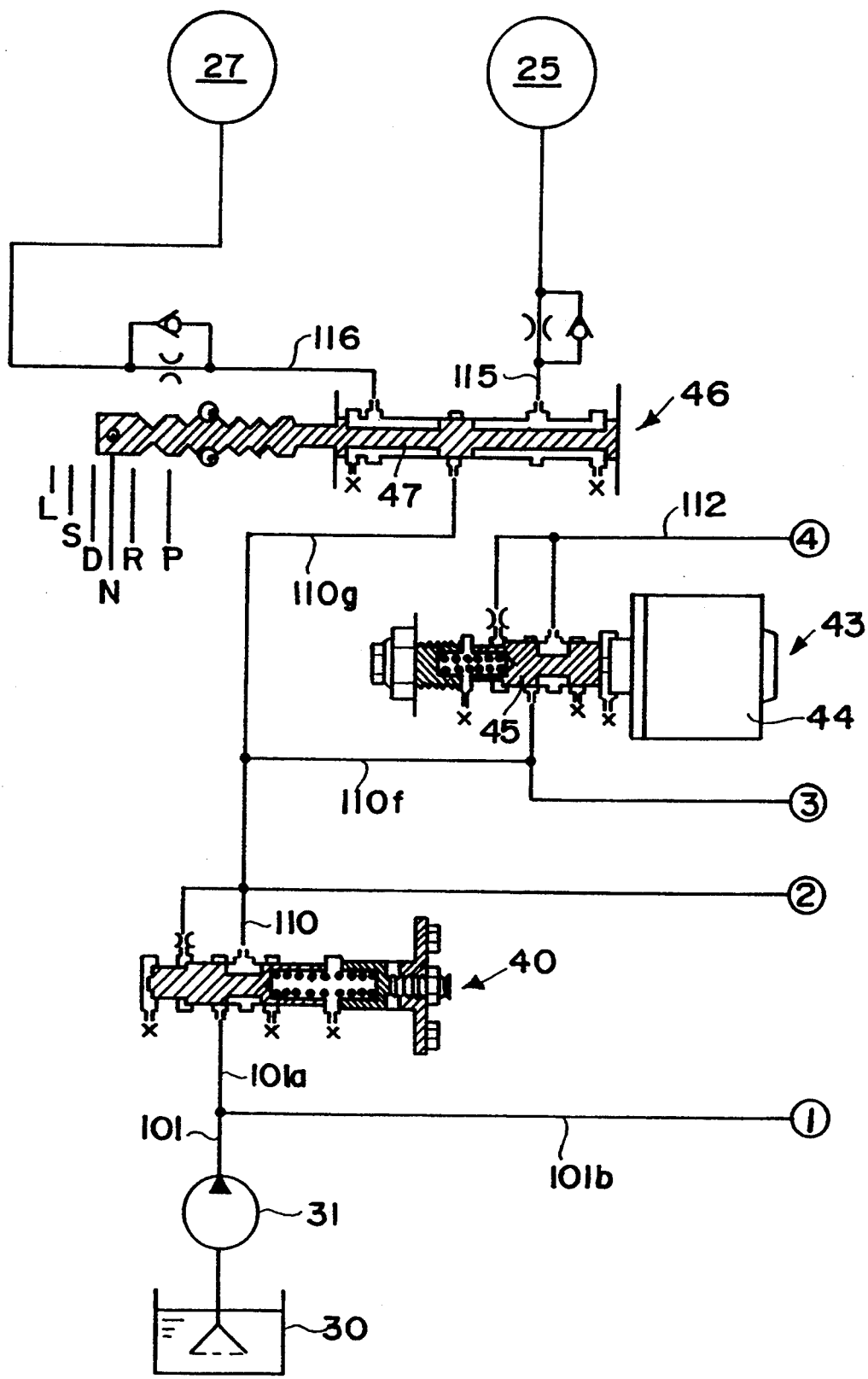
FIGS. 2 and 3 are a circuit diagram of a hydraulic circuit of the control system.

The control system for controlling V-belt-type continuously variable transmission will be described below with reference to FIGS. 2 and 3. The hydraulic circuit arrangements shown in FIGS. 2 and 3 jointly make up a single hydraulic circuit with oil passages indicated by ①, ②, ③, ④ in FIGS. 2 and 3 being joined to each other.

Working oil in a tank 30 is supplied to an oil passage 101 by a pump 31. The working oil is then supplied through an oil passage 101a to a clutch reducing valve 40, which reduces the pressure of the working oil to a line pressure P1 and supplies the working oil under the line pressure P1 to an oil passage 110. The working oil discharged by the pump 31 to the oil passage 101 is also supplied through an oil passage 101b to a high-pressure regulator valve 55.

Control hydraulic pressures $P_{DR}$, $P_{DN}$ supplied to the respective cylinder chambers 14, 19 of the metallic V-belt mechanism 10 to apply lateral pressures to the pulleys 11, 16 are generated by a high/low-pressure control valve 50, a high-pressure regulator valve 55, and a low-pressure regulator valve 57. The high/low-pressure control valve 50 is supplied with the line pressure P1 from the clutch reducing valve 40 through an oil passage 110c. The high/low-pressure control valve 50 converts the line pressure P1 to a control back pressure P2 depending on a push applied from a linear solenoid 51 to a spool 52, and supplies the control back pressure P2 to an oil passage 120.

The high/low-pressure control valve 50 is arranged to maximize the control back pressure P2 so as to be equal to the line pressure P1 when the push from the linear solenoid 51 is minimum. Therefore, if the linear solenoid 51 is de-energized due to an electric failure, for example, the control back pressure P2 is equal to the line pressure P1.

The control back pressure P2 is applied to the high-pressure regulator valve 55 and the low-pressure regulator valve 57 through oil passages 120a, 120b, respectively. The high-pressure regulator valve 55 converts the hydraulic pressure supplied from the pump 31 through the oil passage 101b to a high control pressure PH depending on the control back pressure P2 acting on a spool 56 thereof, and supplies the high control pressure PH to an oil passage 102. The low-pressure regulator valve 57 converts the high control pressure PH supplied from the high-pressure regulator valve 55 through an oil passage 102a to a low control pressure PL depending on the control back pressure P2 acting on a spool 58 thereof, and supplies the low control pressure PL to an oil passage 103.

Figure 7:
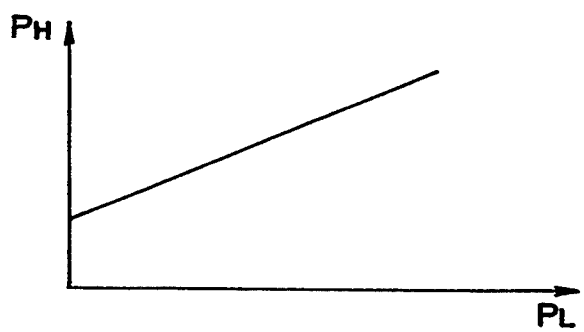
FIG. 7 is a graph showing the relationship between the high and low control pressures established by the control system.

Since the high and low control pressures PH, PL are established depending on the control back pressure P2, they are related to each other at a constant ratio, e.g., as shown in FIG. 7.

The high and low control pressures PH, PL are supplied selectively to the respective cylinder chambers 14, 19 or the respective cylinder chambers 19, 14 of the metallic V-belt belt mechanism 10 through a shift valve 60 for controlling the speed ratio of the V-belt-type continuously variable transmission. The linear solenoid 51 generates a push on the spool 52 depending on the throttle opening and the speed ratio, so that the high and low control pressures PH, PL are maintained in a predetermined relationship to the throttle opening and the speed ratio.

More specifically, the low control pressure PL is set to such an oil pressure which produces an axial thrust force required to keep the metallic V-belt 15 on the pulleys 11, 16 without slippage with respect to the torque that is transmitted through the pulleys 11, 16 and the metallic V-belt 15 at the time.

The high control pressure PH is required to be higher than the low control pressure PL in order to achieve a desired speed ratio control rate. As described above, the high control pressure PH is related to the low control pressure PL as shown in FIG.

The oil passage 120a has an orifice 53 to make the low-pressure regulator valve 55 to be responsive more quickly to the control back pressure P2 than the high-pressure regulator valve Since the working oil discharged from the pump is also supplied to the high-pressure regulator valve 55, the high-pressure regulator valve 55 doubles as a valve for regulating the hydraulic pressure of the working oil discharged from the pump 31.

The high and low control pressures PH, PL thus generated are supplied selectively to the respective cylinder chambers 14, 19 or the respective cylinder chambers 19, 14 to vary the pulley widths of the drive and driven pulleys 11, 16 for controlling the speed ratio of the V-belt-type continuously variable transmission. The supply of the high and low control pressures PH, PL to the cylinder chambers 14, 19 is controlled by the shift valve 60, a shift inhibitor valve and a shift control valve 70.

The shift valve 80 has a spool 61 normally urged to move to the left (FIG. 3) by a spring 62, the spool 61 having a left-hand end facing into an oil chamber 60a connected to an oil passage 114b. The oil chamber 60a is supplied with a shift control pressure Psc (described later). The spool 61 is positioned in a location where the shift control pressure Psc and the bias of the spring 62 are in equilibrium. Stated otherwise, the positioning of the spool 81 of the shift valve 60 can controlled by controlling the shift control pressure Psc.

Figure 3:
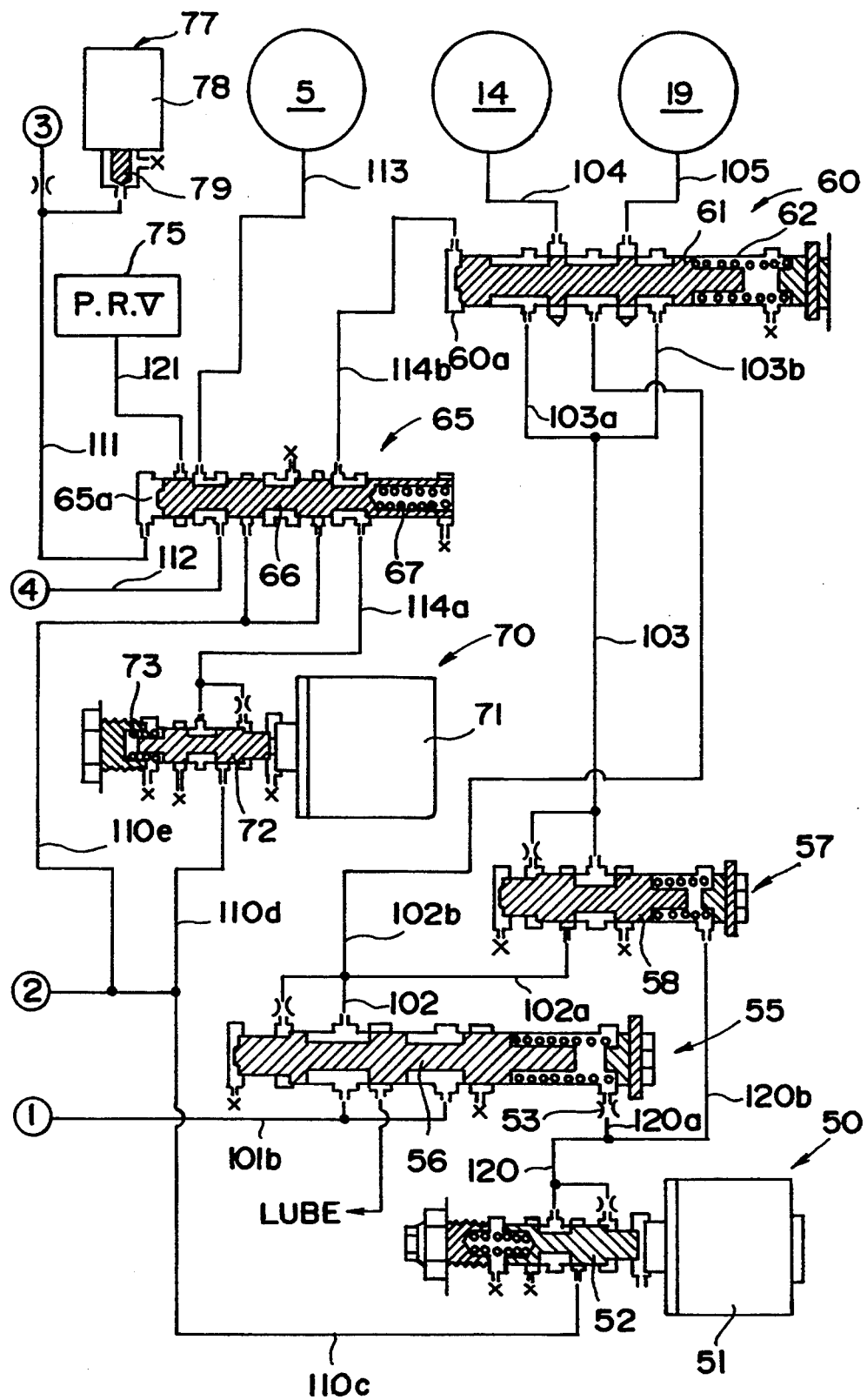
Figure 8:
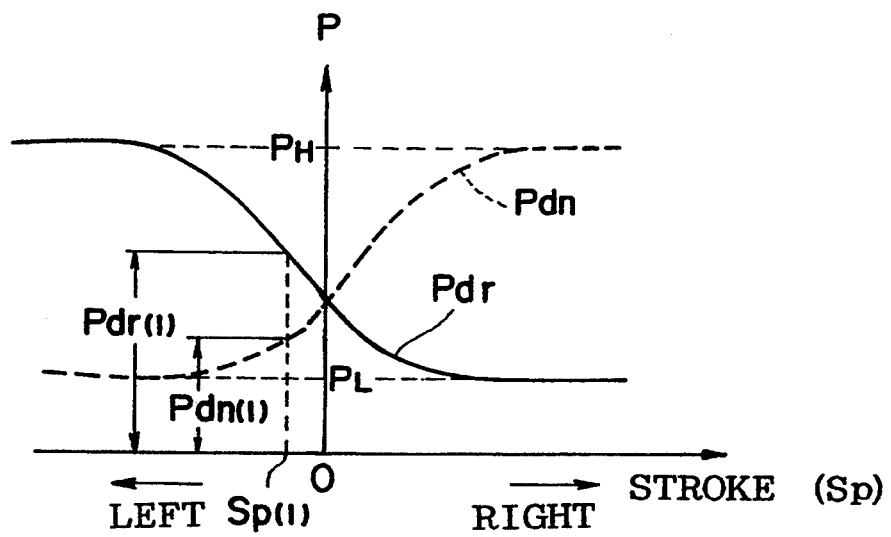
FIG. 8 is a graph showing the relationship between the shift valve stroke and the hydraulic pressures in cylinder chambers combined with drive and driven pulleys in the control system.

As shown in FIG. 3, the shift valve 60 is supplied with the low control pressure PH from the high-pressure regulator valve 55 through an oil passage 102b and the high control pressure PL from the low-pressure regulator valve 57 through oil passages 103a, 103b branched from the oil passage 103. Depending on the position of the spool 61, the high and low control pressures PH, PL are supplied from the shift valve 60 to the respective cylinder chambers 14, 19 or the respective cylinder chambers 19, 14 through oil passages 104, 105. Therefore, the hydraulic pressures in the cylinder chambers 14, 19 vary depending on the position of the spool 61 as shown in FIG. 8.

When the spool 61 is in a neutral position (at this time, the spool stroke Sp=0), the hydraulic pressure $P_{DR}$ in the cylinder chamber 14 of the drive pulley 11 and the hydraulic pressure $P_{DN}$ in the cylinder chamber 19 of the driven pulley 16 are equal to each other. As the spool 61 moves to the right, the drive-pulley-cylinder hydraulic pressure $P_{DR}$ becomes lower, and the driven-pulley-cylinder hydraulic pressure $P_{DN}$ becomes higher. Conversely, as the spool 61 moves to the left, the drive-pulley-cylinder hydraulic pressure $P_{DR}$ becomes higher, and the driven-pulley-cylinder hydraulic pressure $P_{DN}$ becomes lower.

The shift control valve 70 generates the shift control pressure Psc that is supplied to the oil chamber 60a. The shift control valve 70 comprises a linear solenoid 71, a spool 72 axially movable by the linear solenoid 71, and a spring 73 for normally urging the spool 72 to move toward the linear solenoid 71. The shift control valve 70 converts the line pressure P1 supplied from the clutch reducing valve 40 through an oil passage 110d to a hydraulic pressure depending on forces applied from the linear solenoid 71 to the spool 71, i.e., the shift control pressure Psc, and supplies control oil under the shift control pressure Psc to an oil passage 114a. The oil passage 114a is connected through the shift inhibitor valve 65 to the oil passage 114b for supplying the shift control pressure Psc to the oil chamber 60a of the shift valve 60.

The shift inhibitor valve 65 has a spool 66 that is normally urged to move to the left by a spring 87. The spool 86 can be pushed axially to the right by the line pressure P1 that is supplied through an oil passage 111 to an oil chamber 65a that is defined at the left-hand end of the spool 66. The spool 68 is normally shifted to the right against the bias of the spring 67 under the line pressure P1 supplied to the oil chamber 65a. The oil passage 111 can be connected to drain by a normally open solenoid-operated valve 77 that is connected to the oil passage 111.

When a solenoid 78 of the normally open solenoid-operated valve 77 is energized, the oil passage 111 is disconnected from drain by a spool 79. Therefore, the line pressure P1 is supplied to the oil chamber 65a, shifting the spool 66 to the right. When the solenoid 78 is de-energized, the oil passage 111 is drained, substantially eliminating the oil pressure in the oil chamber 85a. The spool 68 is now pushed to the left by the spring 67.

To the shift inhibitor valve 65, there are also connected an oil passage 110e which carries the line pressure P1, an oil passage 113 connected to the starter clutch 5, an oil passage 112 connected to a clutch control valve 43, and an oil passage 121 connected to a pitot regulator valve 75.

When the solenoid 78 is energized, moving the spool 66 to the right as shown in FIG. 3, the oil passages 112, 113, are connected to each other. The clutch control pressure Psc from the clutch control valve 43 is now supplied to the starter clutch 5. At the same time, the oil passages 114a, 114b are connected to each other, allowing the shift control pressure Psc to be supplied from the shift control valve to the oil chamber 60a of the shift valve 60.

When the solenoid 78 is de-energized, permitting the spool 80 to move to the left under the bias of the spring 67, the oil passages 121, 113 are connected to each other, so that a pitot pressure (a hydraulic pressure corresponding the rotational speed of the engine ENG) Ppt from the pitot regulator valve 75 is supplied to the starter clutch 5. At the same time, the oil passages 110e, 114b are connected to each other, thereby supplying the line pressure P1 to the oil chamber 60a of the shift valve 60.

The solenoid 78 is of the normally energized type. It is de-energized, allowing the spool 66 to move to the left only when no electric energy is supplied due to an electric failure caused as by a wire break or the like. Therefore, upon an electric failure, the line pressure P1 is supplied to the oil chamber 60a, fully moving the spool 61 to the right. Consequently, the high control pressure PH is supplied to the driven-pulley cylinder chamber 19 through the oil passages 102b, 105, and the low control pressure PL is supplied to the drive-pulley cylinder chamber 14 through the oil passages 103a, 104. The speed ratio, indicated by i, is now set to LOW.

When the electric power supply is turned off, the linear solenoid 51 of the high/low-pressure control valve 50 is not energized either. However, since the control back pressure P2 (=line pressure P1) is supplied from the high/low-pressure control valve 50 to the oil passage 120 at the time the linear solenoid 51 is de-energized, the high- and low-pressure regulator valves 55, 57 supply the respective high and low control pressures PH, PL depending on the control back pressure P2 to the respective oil passages 102, 103.

When the spool 66 of the shift inhibitor valve 65 is moved to the left due to an electric failure, the oil passages 121, 113 are connected thereby connecting the pitot regulator valve 121 and the starter clutch 5 to each other. The pitot regulator valve 121 has a pitot tube (not shown) projecting into a circular oil groove that rotates at the rotational speed of the engine ENG, and produces the pitot pressure Ppt depending on the rotational speed of the engine ENG. At this time, the pitot pressure Ppt is supplied to the starter clutch 5.

Normally, i.e., when no electric failure occurs, the starter clutch 6 is connected through the oil passages 112, 113 and the shift inhibitor valve 65 therebetween to the clutch control valve 43, and is controlled by a clutch control pressure Pcc supplied by the clutch control valve 43. The clutch control valve 43 generates the clutch control pressure Pcc by controlling the line pressure P1 from an oil passage 110f connected to the oil passage 110 with a linear solenoid 44.

In the event of an electric power supply shutdown due to an electric failure, the linear solenoid 44 is not energized. At this time, however, the spool 66 of the shift inhibitor valve 65 is moved to the left, closing the oil passage 112 and connecting the pitot regulator valve 75 to the starter clutch 5 through the oil passages 121, 113. Thus, the starter clutch 5 is supplied with the pitot pressure Ppt. Consequently, when the rotational speed of the engine ENG is low, the starter clutch 5 is disengaged, and when the rotational speed of the engine ENG is high, the starter clutch 5 is engaged.

The line pressure P1 is also supplied to a manual valve 46 through an oil passage 110g for controlling the forward clutch 25 and the reverse brake 27. The manual valve 46 is connected to the shift lever at the driver's seat through a control cable, and can manually be operated by the driver of the motor vehicle. The manual valve 46 can manually be shifted to one of six positions P, R, N, D, S, L at a time. The manual valve 46 has a spool 47 that is axially movable to one of the positions corresponding to the positions P, R, N, D, S, L to which the manual valve 48 is shifted. In FIG. 2, the spool 47 is shown as being moved to an N (neutral) position.

The positions to which the spool 47 can be moved, and the operating states of the forward clutch 25 and the reverse brake 27 are related to each other as follows:

| Spool position | Forward clutch 25 | Reverse brake 27 |
| --- | --- | --- |
| P | Disengaged | Disengaged |
| R | Disengaged | Engaged |
| N | Disengaged | Disengaged |
| D | Engaged | Disengaged |
| S | Engaged | Disengaged |
| L | Engaged | Disengaged |

A speed ratio control process carried out by the control system will be described in detail below. The speed ratio control process is effected when no electric failure occurs, by controlling an electric current supplied to the linear solenoid 71 of the shift control valve 70.

Figure 4:
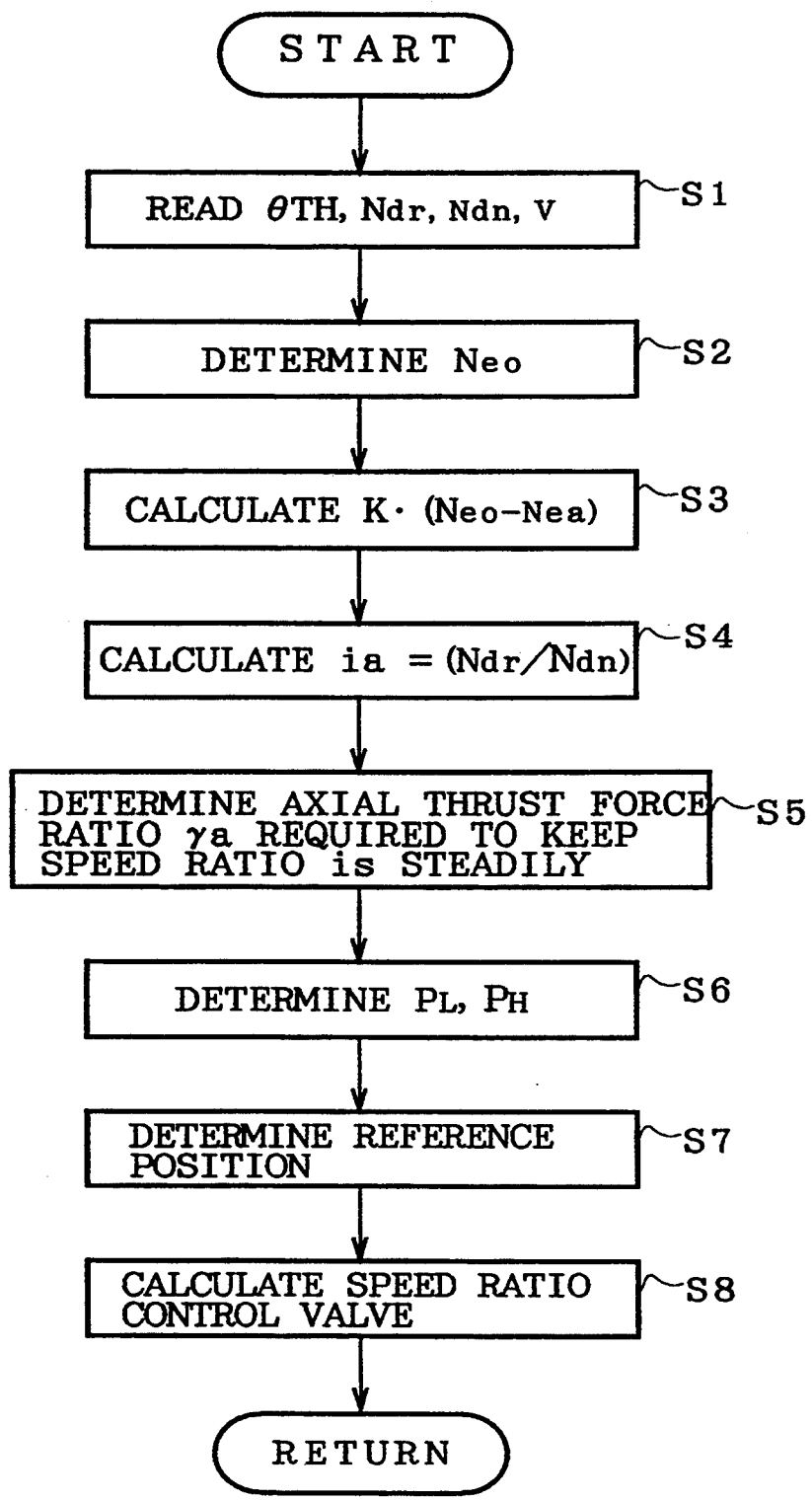
FIG. 4 is a flow chart of a speed ratio control process of the control system.

The speed ratio control process is shown in the flowchart of FIG. 4. The speed ratio control process may be executed by a microcomputer or the like in the control system.

First, a step S1 reads the throttle opening $\theta$th of the engine ENG through the throttle opening sensor 38, the rotational speed Ndr (=engine speed Nea) of the drive pulley 11 with the first speed sensor 35, the rotational speed Ndn of the driven pulley 16 with the second speed sensor 36, and the vehicle speed V with the third speed sensor 37.

Figure 5:
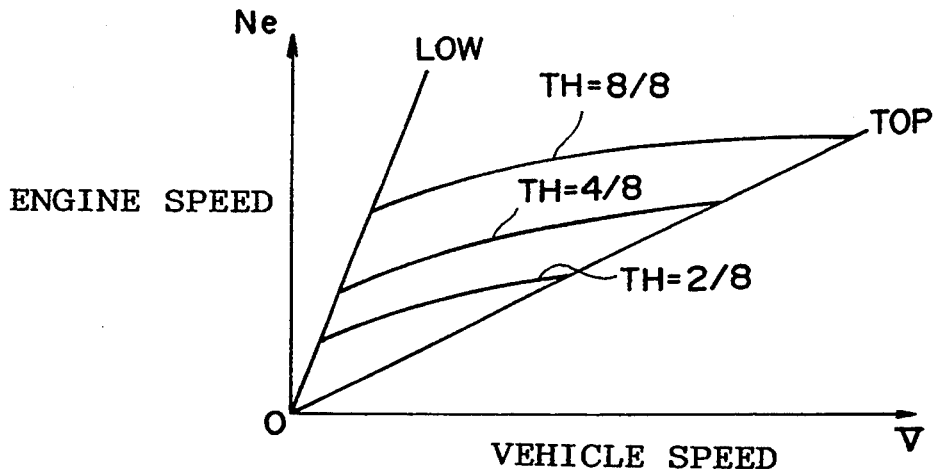
FIG. 5 is a graph showing the relationship between the target engine speed, the vehicle speed, and the throttle opening used in the control process.

Then, a step S2 determines a target engine speed Neo based on the throttle opening $\theta$th and the vehicle speed V from a look-up table memory which stores throttle openings and vehicle speeds that are related to each other as shown in FIG. 5. Solid-line curves LOW, TOP in FIG. 5 are curves where the speed ratio is maximum and minimum, respectively. Since the speed ratio is used in the range between these curves LOW, TOP, a target engine speed is set within this range.

Thereafter, a step S3 calculates the difference or deviation $\Delta$Ne (=Neo−Nea) between the target engine speed Neo and the actual engine speed Nea. Since the speed ratio is controlled to eliminate the difference $\Delta$Ne, the difference $\Delta$Ne as multiplied by a certain gain K is used in order to optimize the speed ratio control rate at the time. Inasmuch as the output shaft of the engine ENG is directly coupled to the input shaft 1, the actual engine speed Nea can be determined from the speed value detected by the first speed sensor 35.

Then, a present speed ratio ia (=Ndr/Ndn) is calculated from the rotational speed Ndr of the drive pulley 11 and the rotational speed Ndn of the driven pulley 16 in a step S4. A next step S5 determines an axial thrust force ratio $\gamma$a between an axial thrust force $Q_{DR}$ which needs to be applied from the cylinder 14 to the belt 15 and an axial thrust force $Q_{DN}$ which needs to be applied from the cylinder 19 to the belt 15 to keep the present speed ratio $i_a$ steadily.

As a result of various experiments conducted on metallic V-belt continuously variable transmissions, the applicant has found that the speed ratio i and the axial thrust force ratio $\gamma$ are related to each other substantially as indicated by the curve shown in FIG. 8 when the speed ratio i is kept constant if a safety factor Sf (a margin with respect to a slippage limit of the belt) is about 1.3. It has also been found that the illustrated relationship is uniquely determined and is essentially not affected by the magnitudes of the transmitted torque and the axial thrust force, and that the illustrated relationship remains almost unchanged even if the safety factor Sf varies from 1.3 to a certain extent, i.e., insofar as the safety factor Sf falls in a practical range.

Figure 6:
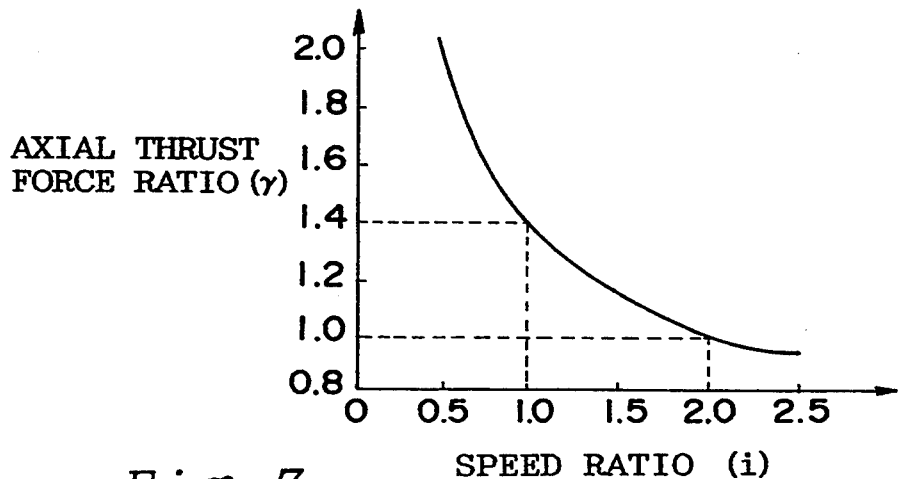
FIG. 6 is a graph showing the relationship between the speed ratio and the axial thrust force used in the control process.

As can be understood from FIG. 6, the axial thrust force ratio $\gamma$ is about 1.0 when the speed ratio i=2.0. Stated otherwise, the speed ratio i becomes substantially 2.0 when the axial thrust force $Q_{DR}$ to be applied from the cylinder 14 to the belt 15 and the axial thrust force $Q_{DN}$ to be applied from the cylinder 19 to the belt 15 are equal to each other.

In the step S5, the axial thrust force ratio $\gamma$a corresponding to the present speed ratio ia is read from the curve shown in FIG. 6. If the present speed ratio ia is 2.0, for example, then the axial thrust force ratio $\gamma$a is 1.0. If the present speed ratio $i_a$ is 1.0, for example, then the axial thrust force ratio $\gamma$a is 1.4. The axial thrust force ratio $\gamma$a thus read is an axial thrust force required to keep the present speed ratio constant.

Then, control goes to a step S6 which determines the high control pressure PH to be produced by the high-pressure regulator valve 55 and the low control pressure PH to be produced by the low-pressure regulator valve 57.

As shown in FIG. 6, as long as the speed ratio i is in a practical range from about 0.5 to 2.0, the axial thrust force ratio γ is substantially greater than 1.0, and hence the axial thrust force $Q_{DR}$ of the drive pulley 11 is larger than the axial thrust force $Q_{DN}$ of the driven pulley 16. Thus, the low control pressure PL is set to such a value that a suitable axial thrust force is generated not to cause the belt 15 to slip on the driven pulley 16.

The low control pressure PL can be determined from the equation:

$$PL = (Sf \times Tin \times \cos \alpha)/(2 Rdr \times \mu \gamma dn \times Sdn)$$

where

Sf: the safety factor (which is the margin with respect to the slippage limit and is about 1.3);

Tin: the input shaft torque;

α : the angle at which a pulley surface is inclined (see FIG. 1);

Rdr: the radius of a circle around which the belt 15 is trained on the drive pulley 11;

μdn: the coefficient of friction between the driven pulley 16 and the belt 15; and Sdn: the pressure-bearing area of the cylinder chamber 19 of the driven pulley 16.

Once the low control pressure PL is determined in the manner described above, the high control pressure PH is automatically determined from the relationship shown in FIG. 7. More specifically, when the low control pressure PL is determined according to the equation given above, the electric current supplied to the linear solenoid 51 of the high/low-pressure control valve 50 is controlled to enable the low-pressure regulator valve 57 to produce the low control pressure PL. At this time, the control back pressure P2 from the high/-low-pressure control valve 50 is also supplied to the high-pressure regulator valve 56, which generates the high control pressure PH that is related to the low control pressure PL as shown in FIG. 7.

After the high and low control pressures PH, PL are thus determined, the relationship between the stroke Sp of the shift valve 60 and the hydraulic pressures $P_{DR}$, $P_{DN}$ supplied to the cylinders 14, 19 is determined as shown in FIG. 8 for supplying the high and low control pressures PH, PL through the shift valve 60 to the cylinders 14, 19.

A step S7 then determines a stroke Sp(1) of the shift valve 60 which is required to obtain the axial thrust force ratio γa that has been determined in the step S5. The position of the spool 61 at the determined stroke Sp(1) is referred to as a reference position.

In the reference position, as shown in FIG. 8, a hydraulic pressure $P_{DR}(1)$ is supplied to the cylinder 14 of the drive pulley 11, and a hydraulic pressure $P_{DN}(1)$ is supplied to the cylinder 19 of the driven pulley 16. If it is assumed that the cylinders 14, 19 have respective pressure-bearing areas Sdr, Sdn, then the axial thrust forces $Q_{DR}$, $Q_{DN}$ applied respectively by the cylinders 14, 19 are expressed as follows:

$$Q_{DR} = P_{DR} \times S_{DR}, \text{ and}$$

$$Q_{DN} = P_{DN} \times S_{DN}.$$

At this time, the axial thrust force ratio γa is γa = $Q_{DR}/Q_{DN}$. Stated otherwise, the stroke Sp(1) to obtain the axial thrust force ratio γa is determined, and regarded as the reference position.

Figure 9:
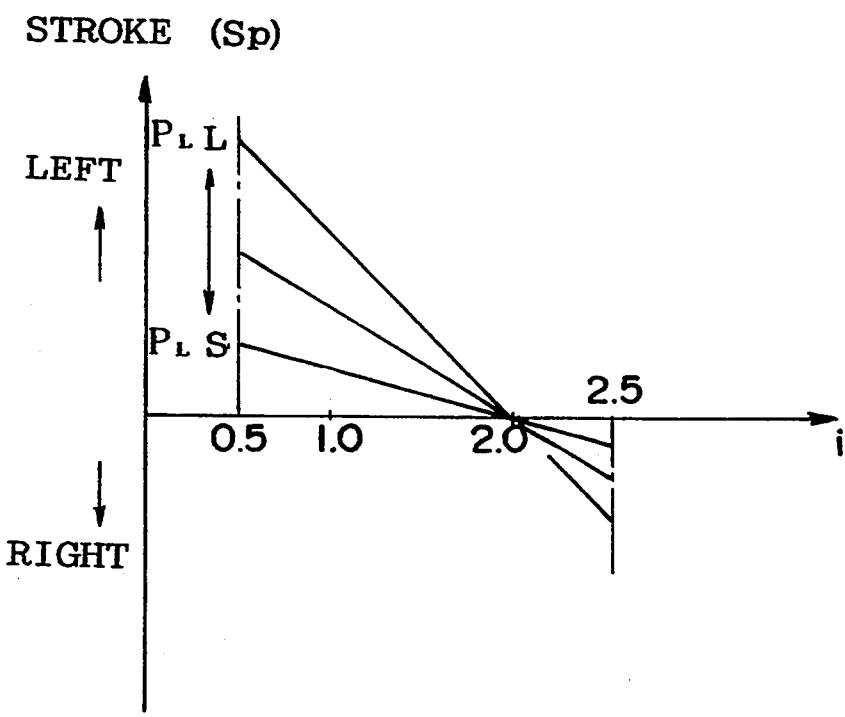
FIG. 9 is a graph showing the relationship between the low control pressure and the shift valve stroke for obtaining a certain speed ratio in the control system.

Once the high and low control pressures PH, PL are determined, the relationship shown in FIG. 8 is established. The relationship between the speed ratio ia and the axial thrust force ratio γa to achieve the speed ratio ia is determined as shown in FIG. 6. Therefore, it is possible to establish in advance the relationship between the speed ratio $i_a$ and the stroke Sp of the shift valve 60 for each value of the low control pressure PL as shown in FIG. 9, for example. The relationship shown in FIG. 9 may be stored in a memory, and when the speed ratio $i_a$ and the low control pressure PL are determined, a corresponding stroke Sp may be read from the memory to determine the above reference position.

Thereafter, control proceeds from the step S8 to a step S8 which calculates a speed ratio control value by adding the difference (=K(Neo−Nea)) calculated in the step S3 and a signal representative of the reference position determined in the step S7. A control signal representing the calculated speed ratio control value is then applied to control the energization of the linear solenoid 71 of the shift control valve 70.

In this manner, the speed ratio control process is carried out to eliminate the difference ΔNe between the target speed ratio control value (the target engine speed Neo) and the present speed ratio control value (the actual engine speed Nea) with respect to the reference position. The reference position is a position where the present speed ratio is maintained, i.e., the actual engine speed Nea is achieved. Therefore, the speed ratio control process can be carried out without a constant state deviation by controlling the transmission to eliminate the difference ΔNe from the reference position. The speed ratio control rate may be set to a suitable value by adjusting the gain K (see the step SS) by which the difference ΔNe is to be multiplied.

Figure 10:
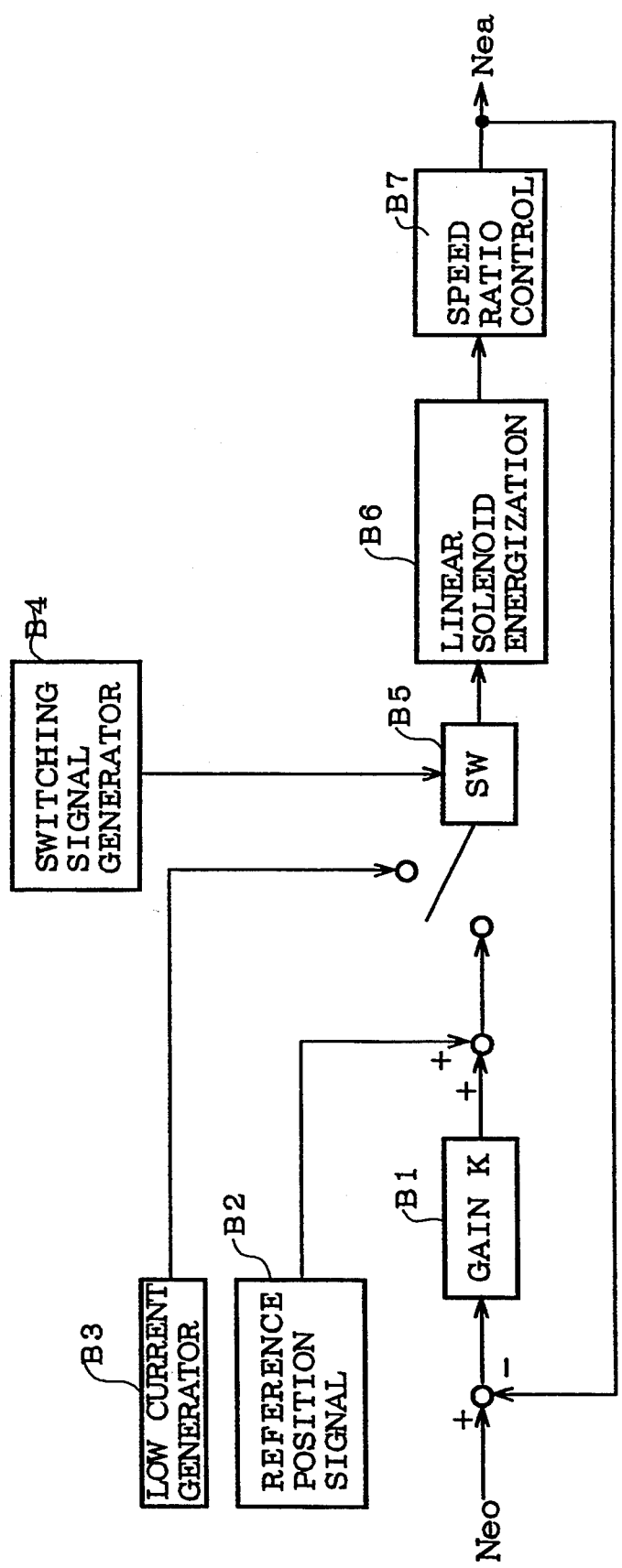
FIG. 10 is a block diagram of a control sequence of the control system.

The above speed ratio control process to determine the speed ratio control value may be effected by a control sequence indicated in block form in FIG. 10.

In FIG. 10, the actual engine speed Nea is deduced from the target engine speed Neo to calculate the engine speed difference ΔNe (=Neo−Nea), which is then multiplied by the gain K in a block B1. To an output signal (=K ×ΔNe) from the block B1, there is added a reference position signal from a block B2, producing a speed ratio control signal.

The speed ratio control process is carried out based on the speed ratio control signal thus produced. The control system has a switching signal generator B4 which applies a LOW-fixed mode signal to a selector switch B5 when the reverse position is selected. The selector switch B5 normally passes the speed ratio control signal from the block B1. However, when the LOW-fixed mode signal is applied from the switching signal generator B4, the selector switch B5 is connected to a LOW current generator B3 to supply a LOW current as a linear solenoid energizing current to a block B6.

In the block B6, the energization of the linear solenoid B1 of the high/low-pressure control valve 50 is controlled based on the speed ratio control signal selected by and supplied from the selector switch B5. The hydraulic pressures in the cylinder chambers 14, 19 of the drive and driven pulleys 11, 16 are controlled to vary the speed ratio (block B7). As a result, the actual engine speed Nea is varied, and the speed ratio control process is continued using the varied actual engine speed Nea.

In the block B1, a proportional (P) control process is carried out, i.e., the control value is calculated by multiplying the difference ΔNe by the gain K. However, a proportional plus integral (PI) control or proportional pulse integral plus derivative (PID) control process may be carried out in the block B1.

The above-mentioned relationship between the speed ratio i and the axial thrust force ratio γ(the relationship as shown in FIG. 6) is found by the applicant through a variety of experiments using a metal V-belt CVT. The experiments are described hereinafter.

As metal pushing V-belt type CVTs are able to achieve more efficient operation with respect to drive performance and fuel consumption than conventional automatic transmissions, CVT systems are attracting people's attention these days. A small automobile which has this system has come onto the market. CVT systems can be achieved by changing the belt pitch radius using width-adjustable pulleys. For automobiles, this change is often controlled by pulley thrusts. However, it is not well known how to control the thrust so that the optimum condition is achieved. Although there have been some papers on the mechanisms and characteristics of metal pushing V-belt type CVTs recently, thrust ratios have not been fully explained not only in transient states but also in steady states. The role and function of thrust in rubber V-belts and block-V-belts has been under investigation for a long time. Some clear conclusions have gradually emerged from such investigations. However, it is not clear, whether such conclusions are applicable to metal pushing V-belts.

The relation between pulley thrusts and transmitted torque in constant states is studied experimentally. The effect of belt speed (rotational speed of the pulley) of a metal pushing V-belts on this relation is also investigated. The question whether the thrust theory for rubber V-belt systems is applicable to metal pushing V-belt systems is also investigated. These investigations lead to a practical equation which can be used to estimate the thrust ratio in steady states.

EXPERIMENT

Metal pushing V-belt(metal V-belt)

Figure 11:
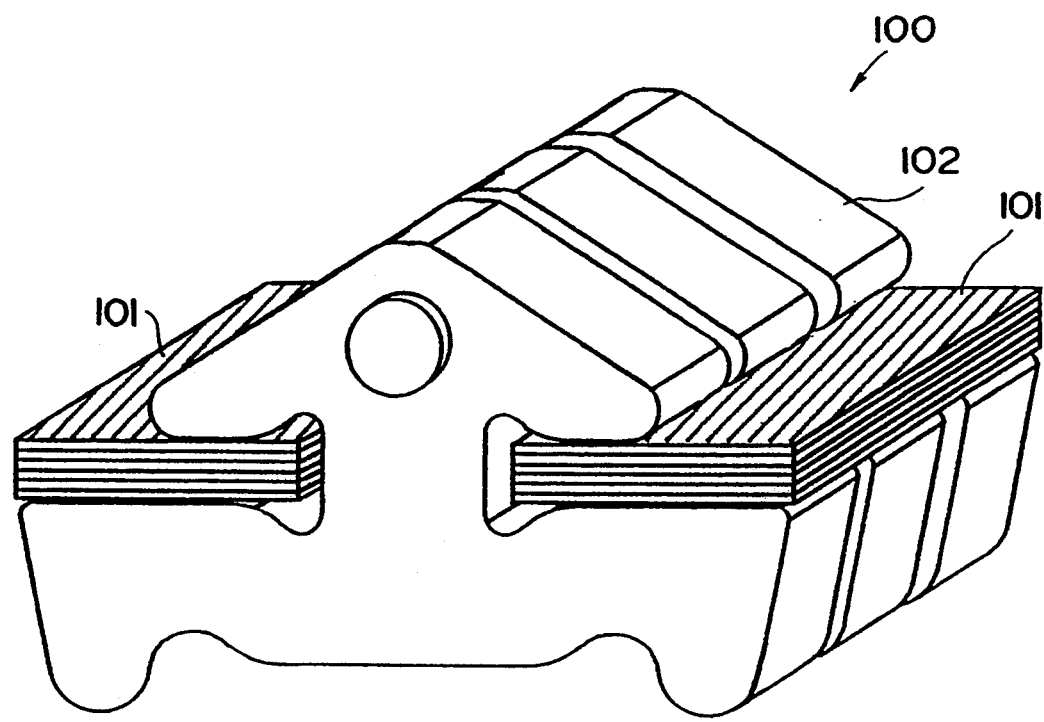
FIG. 11 is a prespective view of the metal V-belt structure.
Figures 12A, 12B:
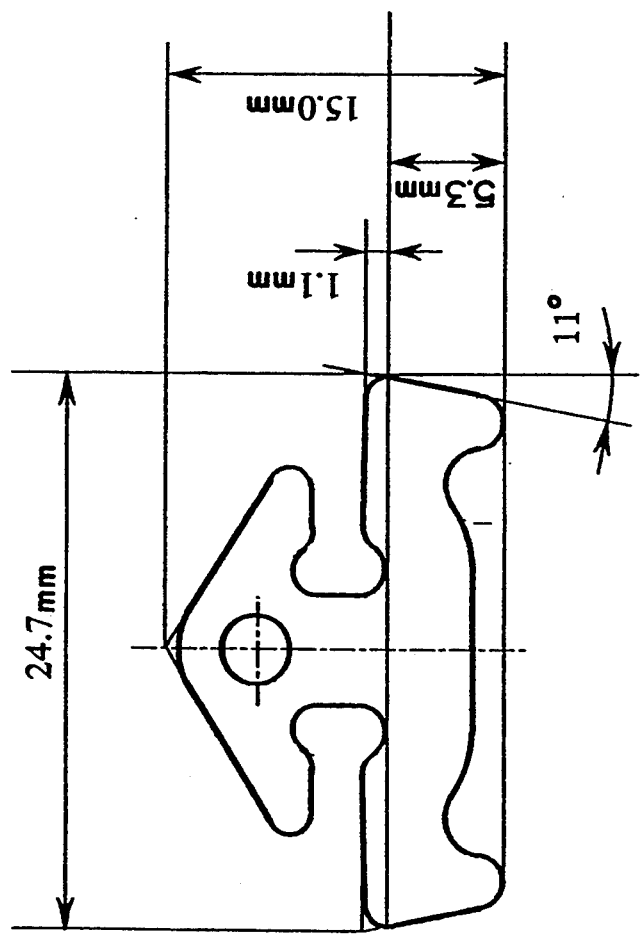
FIGS. 12A and 12B are a front view and a side view of the metal block.

A metal V-belt developed by Van Doorne's Transmission consists of a number of thin, flat tension rings and metal V-blocks which fill the entire length of the rings. FIG. 11 shows the metal V-belt assembly-and the metal V-belt structure. FIGS. 12A and 12B show the dimensions of the block. Each ring is approximately 0.2 mm thick, and is laminated. Thin blocks are strung together by 2 sets of thin rings positioned in slots at each sides of the blocks.

EXPERIMENTAL APPARATUS

Figure 13:
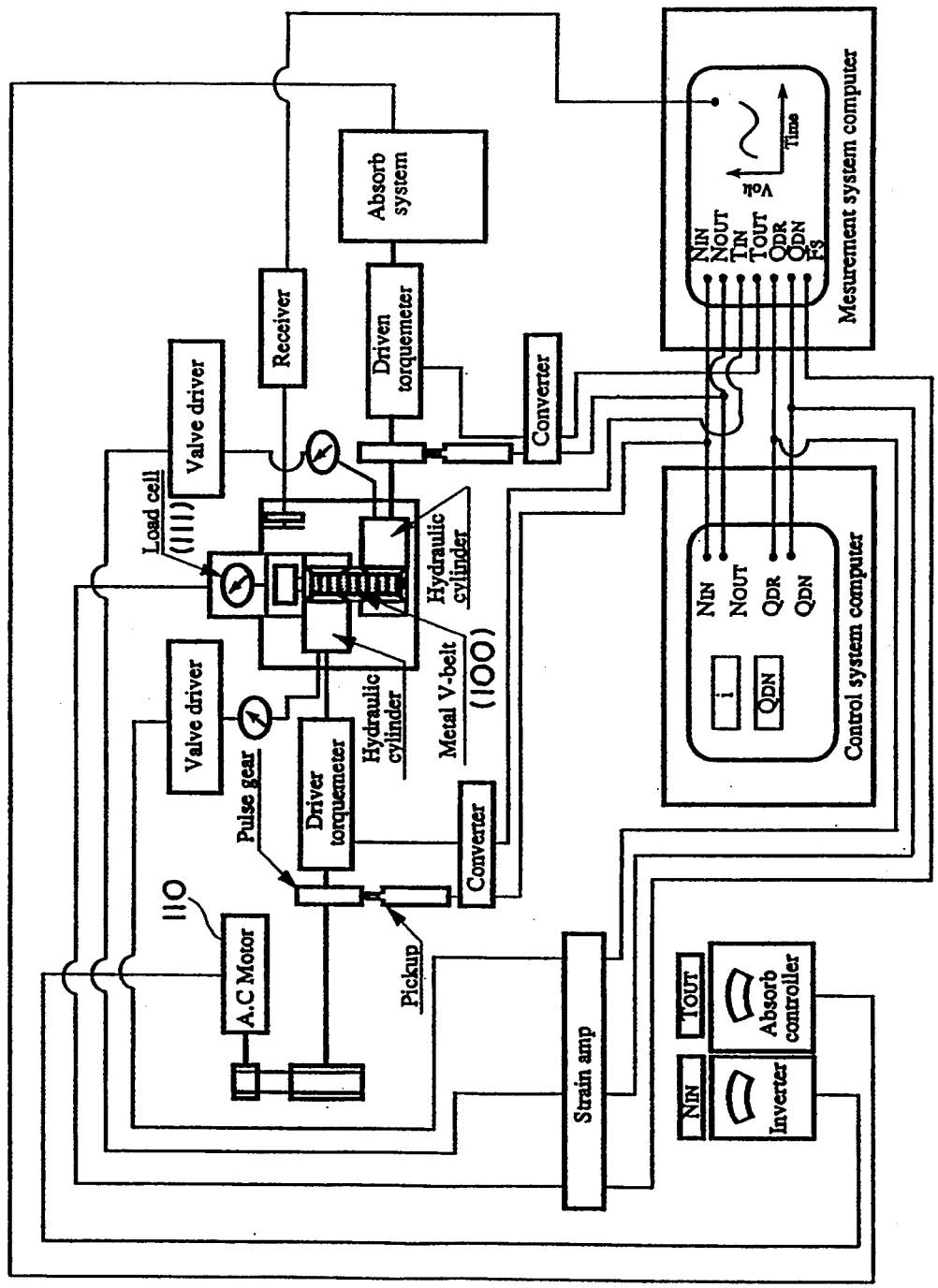
FIG. 13 is a schematic diagram of the measuring system.

FIG. 13 is an assembly drawing of a metal pushing V-belt type CVT testing machine. A variable speed A.C. motor drives the driving pulley. Torque transmitted to the driven side through the metal V-belt is counter-balanced by torque load in a powder brake. Various speed ratios can be obtained by adjusting oil pressure in the driving and driven pulleys. Driving pulley thrust ($Q_{DR}$) and driven pulley thrust ($Q_{DN}$), speed ratio (i), transmitted torque ($T_{in}$ measured at driving pulley) and axial force (tensile force acting between two pulleys: $F_s$) are measured during the tests. Speed ratio is defined as a rotational speed of the driving pulley divided by a driven pulley speed. That is, $i = N_{in}/N_{out}$. Torque ratio (r) is defined as transmitted torque divided by the maximum transmittable torque ($T_{in}^*$). That is, $r = T_{in}/T_{in}^*$.

EXPERIMENTAL PROCEDURE

Figure 18:
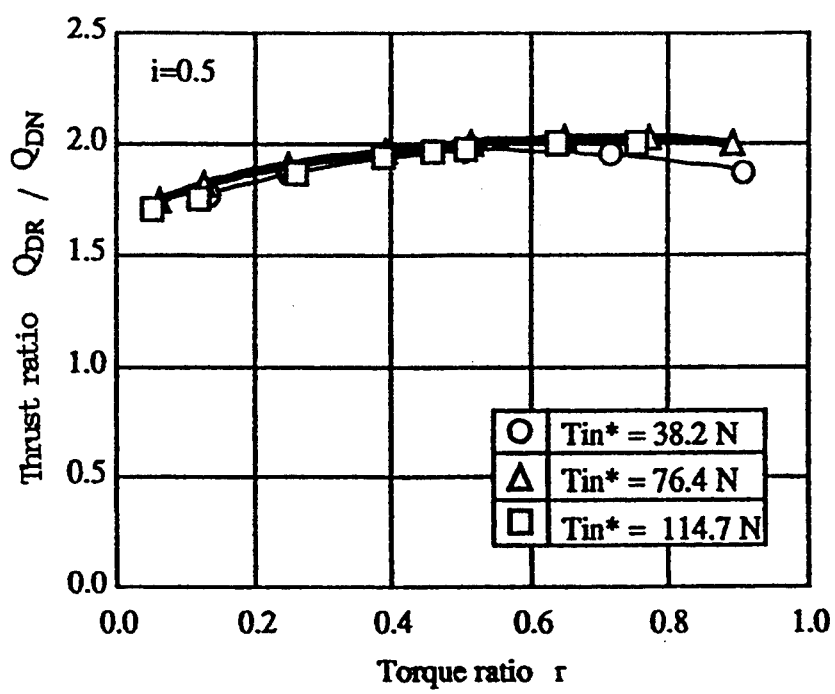
FIGS. 18 to 22 are graphs showing the relationships between thrust ratio and torque ratio resulting from experiments.
Figure 19:
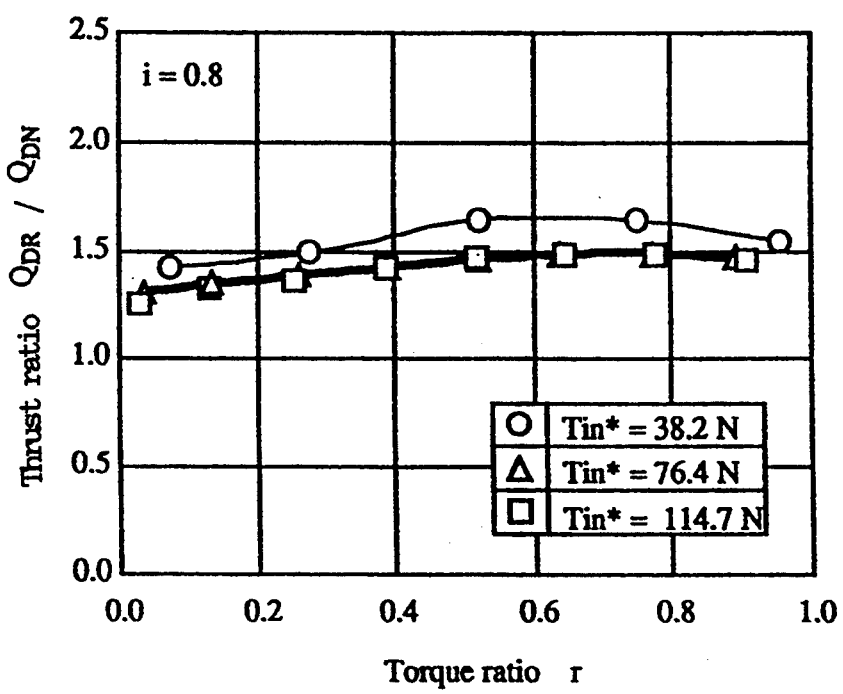
Figure 20:
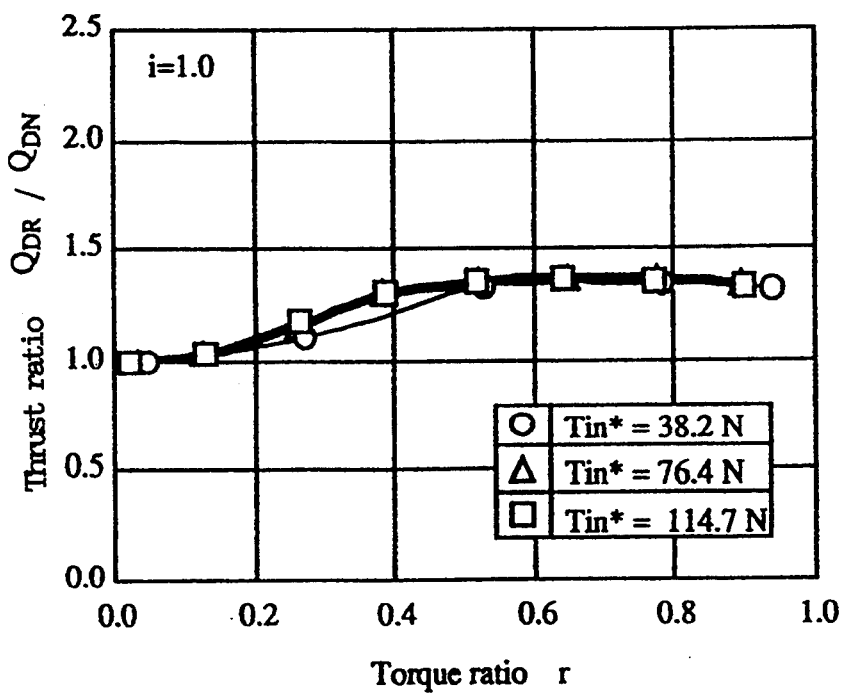
Figure 21:
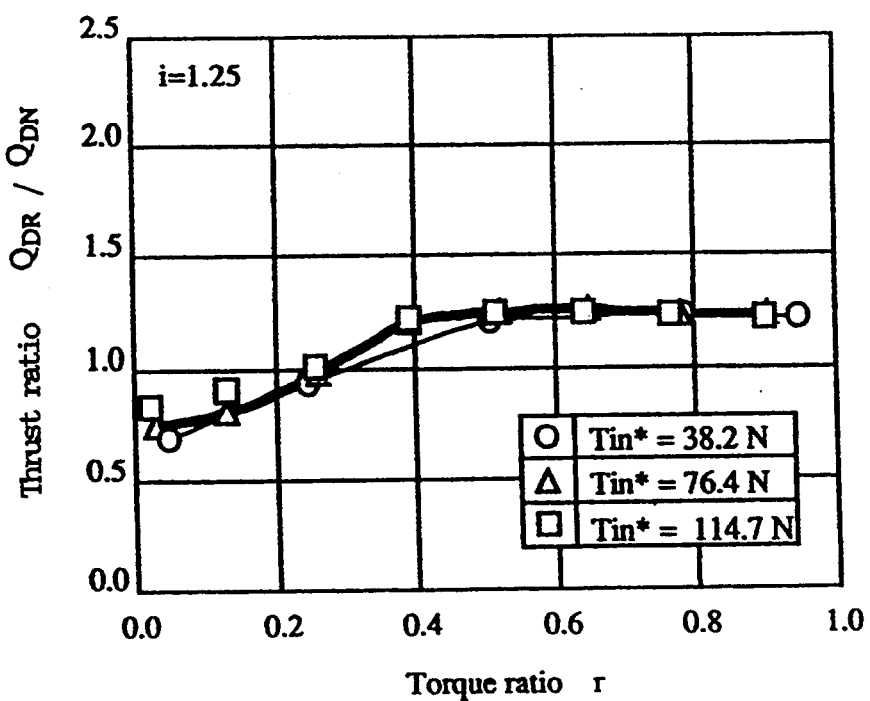

Experiments are conducted according to the following procedure at conditions shown, for example, in FIG. 18:

(1) Apply a driven thrust which corresponds to the maximum transmittable torque as the occasion demands.

(2) After setting the rotational speed of the pulley and torque ratios on the driven pulley, adjust the thrust of the driving pulley to get the demand speed ratio and torque ratios.

The experiment to identify the effect of rotational speed on pulley thrusts and so on, is also conducted. Under low rotational speed conditions, the belt speed is kept at approximately 1.1 m/s or 2.2 m/s. Under high rotational speed conditions, the driving pulley rotational speed is kept constant, $N_{in} = 2000$ rpm, 3000 and 4000 rpm.

RESULTS AND DISCUSSION

Relation between thrust ratio ($Q_{DR}/Q_{DN}$) and torque ratio (r) at several different belt speed ratio (i)

FIGS. 18-22 show the relations between thrust ratio ($Q_{DR}/Q_{DN}$) and torque ratio (r). The parameters are maximum transmittable torque ($T_{in}^*$), and speed ratio $i = 0.5 \sim 2.5$.

There is a linear relation between driven pulley thrust and maximum transmittable torque. The following equation shows the relation:

$$Qdn = \frac{T_{in}'\cos \alpha}{2\mu R_{DR}} \quad (1)$$

where, α is the half-wedge angle of the pulley. $R_{DR}$ is the pitch radius of the driving pulley. μ is the maximum coefficient of friction between a pulley and blocks. Accordingly, the parameter $T_{in}^*$ linearly corresponds to $Q_{DN}$. Belt engineers sometimes use a coefficient of traction λ which is $(T_{in}/R_{DR})/F_s$ in place of a torque ratio when assessing the CVT system in the following section. In this case, it is necessary to know the axial force. But, it is difficult to measure the axial force at operation and to control the CVT system using the axial force due to the complex structure of the system. The driving and driven axes are fixed at practical CVT systems. It is generally controlled by changing thrusts in response to a given speed radio and transmitted torque. Consequently, characteristics of CVT systems are better expressed by torque ratio in the form of FIGS. 18-22. It is obvious that the maximum transmittable torque has almost no effect on the relation between thrust ratio and torque ratio as shown in FIGS. 18-22. When i=0.8, in low torque ratios, the thrust ratio slightly differs from other thrust ratios. The relation between driven pulley thrust and the maximum transmittable torque is linear within the limit of the maximum transmittable torque in this experiment as mentioned above. Accordingly, the mechanism of power transmission is linear in regard to the maximum transmittable torque, in other words, in regard to the driven pulley thrust. These results correspond to what Gerbert and others expressed about the thrusts in their theoretical analysis of ordinary rubber V-belts Gerbert and others expressed the thrusts with respect to the coefficient of traction.

The relation between thrust ratio and torque ratio is approximately expressed by bi-linear line in half. Especially, when i>1.0, a significant trend can be seen. The break point is at about r=0.4. On and after the r=0.4 point, thrust ratio is almost constant.

Figure 14:
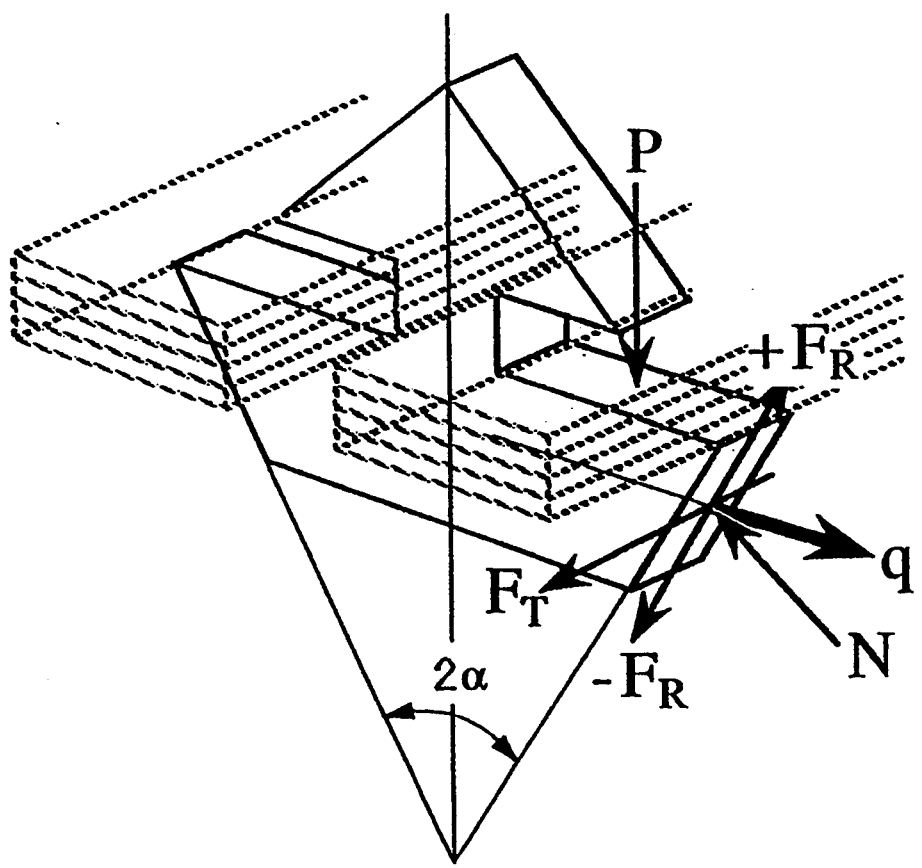
FIG. 14 is a semi diagrammatical view showing forces acting on the metal block.

FIG. 14 illustrates forces acting on a block, integrated shearing force on a pulley gives an effective transmitted force $E^* = T_{in}/R_{DR}$. The relation among normal force from rings (P), normal force from pulley (N) and frictional force in the radial direction between a block and a pulley ($F_R$) is as follows:

$$\frac{P}{2} = N\sin\alpha \pm F_R\cos\alpha \quad (2)$$

A plus sign is defined as the radial inward direction of the block (which is the upward direction in FIG. 5). The following equation is also obtained:

$$q = N\cos\alpha \pm F_r\sin\alpha \quad (3)$$

Summation of q on all blocks contacted with a pulley gives the thrust. The coefficient of friction in the radial direction between blocks and the pulley is defined as $\mu_R$. The frictional force in the radial direction ($F_R$) is defined as:

$$F_R = \mu_R N \quad (4)$$

The frictional force in the tangential direction ($F_T$) is also given by the following equation where $\mu_T$ is defined as a coefficient of friction in the tangential direction.

$$F_T = \mu_T N \quad (4)$$

However, the following relation between these coefficients of friction must be held.

$$\mu = \sqrt{\mu_T^2 + \mu_R^2} \quad (5)$$

$F_T$ is large while $F_R$ is small in the case that load is large and slip occurs between the pulley and blocks. However, when $\alpha = 11$, because of small value of $F_R$, the thrust on the block is expressed by the following approximate equation:

$$q \approx N \quad (6)$$

Thus, the thrust (Q) is expressed by a constant proportion (K) because N is expected to be constant through the contact arc:

$$Q \approx k\theta_O \quad (7)$$

Where $\theta_O$ is a contact arc of the pulley. In high torque ratios, it is supposed that the change of thrust on the driving pulley is small according to the torque change since $\mu_T$ becomes large and $F_R$ is small under constant thrust on the driven pulley. This supposition has good agreement with data of FIGS. 18–22.

When no-load is transmitted, the transmitted force in the tangential direction is zero. Therefore, it is assumed that the maximum coefficient of friction only acts in the radial direction. Then, the thrust ratio ($Q_{DR}/Q_{DN}$) is expressed by the ratio of contact arc ($\theta DR/\theta DN$):

$$\frac{P_{DR}}{P_{DN}} = \frac{\tan\alpha + \mu_{DN}}{1 + \mu_{DN}\tan\alpha} - \frac{1 + \mu_{DR}\tan\alpha}{\tan\alpha + \mu_{DR}} - \frac{\theta_{DR}}{\theta_{DN}} \quad (8)$$

Figure 23:
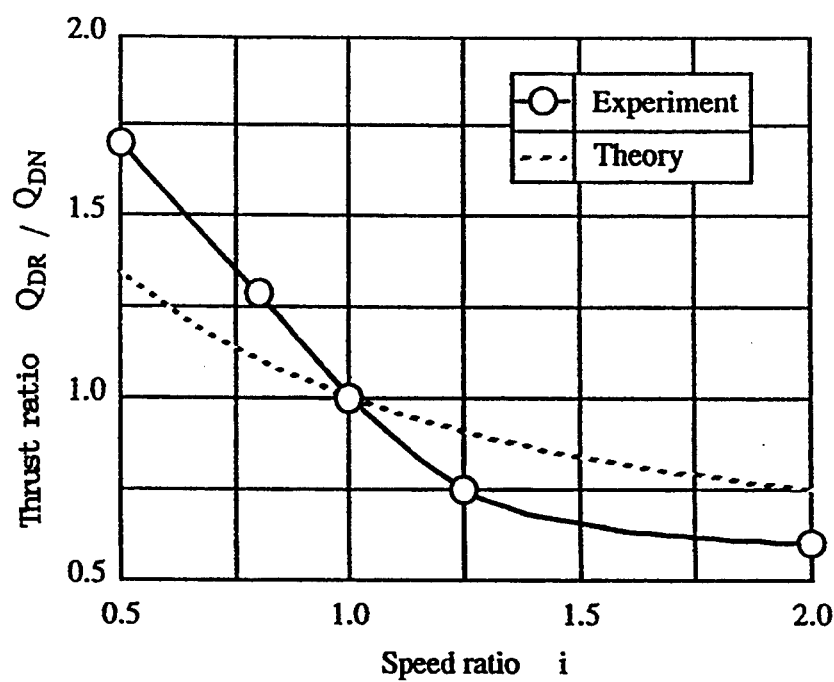
FIG. 23 is a graph showing the relationship between thrust ratio and speed ratio.
Figure 24:
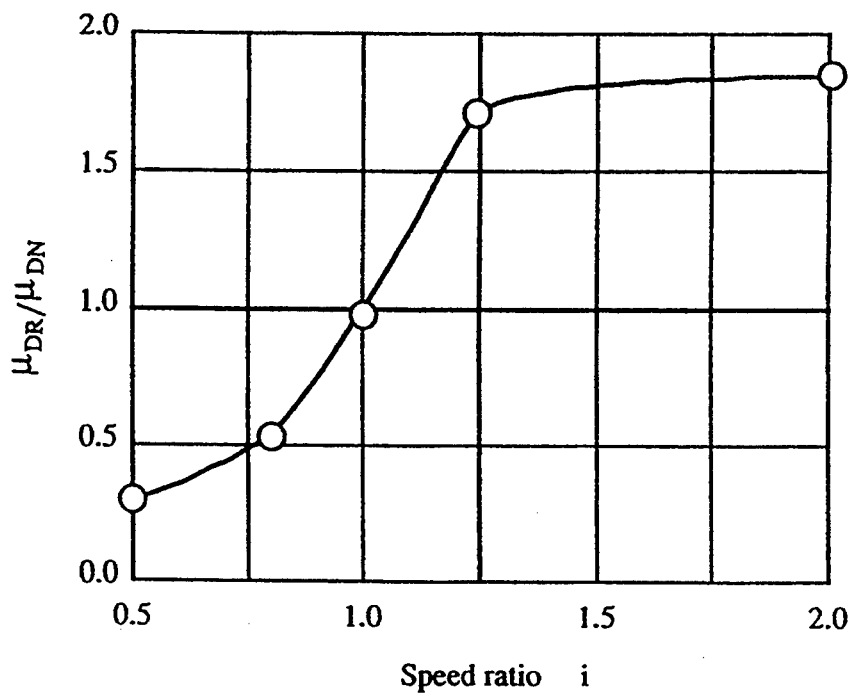
FIG. 24 is a graph showing the relationship between a ratio of coefficients of friction and a speed ratio.

If both coefficients of friction are identical, the thrust ratio ($Q_{DR}/Q_{DN}$) is not affected by the coefficient of friction. FIG. 23 shows the relation between speed ratio (i) and thrust ratio ($Q_{DR}/Q_{DN}$). A broken line is obtained from Eq.(8). Open circles show the experimental results. In the calculation, $\mu_{DR}=\mu_{DN}$ is assumed. The calculated result agrees qualitatively with the experimental result as the thrust ratio decreases with an increase of speed ratio. However, no quantitative coincidence between the two is obtained except in the case of i−1.0. FIG. 24 shows the relation between ratio of coefficients of friction ($\mu_{DR}/\mu_{DN}$) and speed ratio (i). A different coefficient of friction for each pulley must be used in order to make the calculated result agree with the experimental result. When the belt speed is low, it is hard to suppose that the maximum coefficient of friction takes different value at each pulley. In the no-load situation, it is conceivable that the transmitted force between belts and pulleys is macroscopically canceled, and that a complicated distribution of transmitted force exists along the belt in both cases (i<1.0 and i>1.0).

Figure 15:
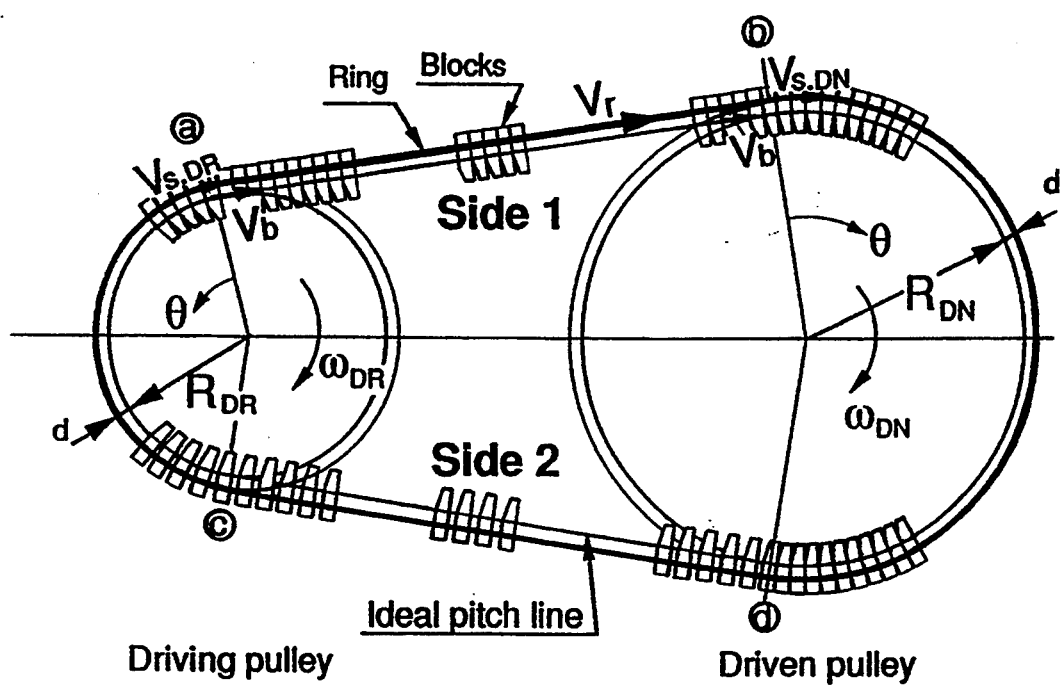
FIGS. 15 to 17 are diagrammatical front views of the metal V-belt.

FIG. 15 illustrates a power transmitting condition of the metal pushing V-belt, It also illustrates speed of the blocks and the rings. A block is pushed out from [a] and enters the driven pulley at [b]. When using the metal V-belt, and at high torque ratios, the torque is primarily transmitted by block compression force (E). Consequently, compression force acts from [a] to [b] (Side 1). On the other hand, there is no compression force between the blocks from [d] to [c] (Side 2) because of the existence of gaps between the blocks. FIG. 15 is an exaggerated illustration of these phenomena. But, block compression force also exists on Side 2 under certain speed ratio and torque ratio as later discussed. There is no apparent slip between pulley and blocks on the pitch line. On the other hand, FIG. 14 shows that surface of contact between rings and blocks (which is named "saddle") is situated out side of the pitch line. In fact, the stiffness of blocks is so high that an elastic slip would be very small along the contact arc. Accordingly, the blocks would adhere to the pulley on the pitch line. The speed of the blocks at the pitch line on the driving pulley and the driven pulley is $V_b$. The angular velocity on each pulley, that is $\omega_{DR}$ and $\omega_{DN}$, is:

$$\omega_{DN}59 \, b/R_{DR}, \, \omega_{DN} = \nabla b/R_{DN} \quad (9)$$

The saddle speed on the driving pulley is $V_{s.DR} = R_{DR}+d) \psi_{DR}$. The saddle speed on the driven pulley is $V_{s.DN} = (R_{DN}+d) \psi_{DN}$. In these equations, d is the difference between the pitch radius and the radius of the saddle surface. The saddle speed of the two pulleys is different. The ratio of both saddle speeds is:

$$\frac{V_{SDR}}{V_{SDN}} = \frac{(R_{DR} + d)}{\left(R_{DN} + \dfrac{d}{i}\right)} \quad (10)$$

Figure 16:
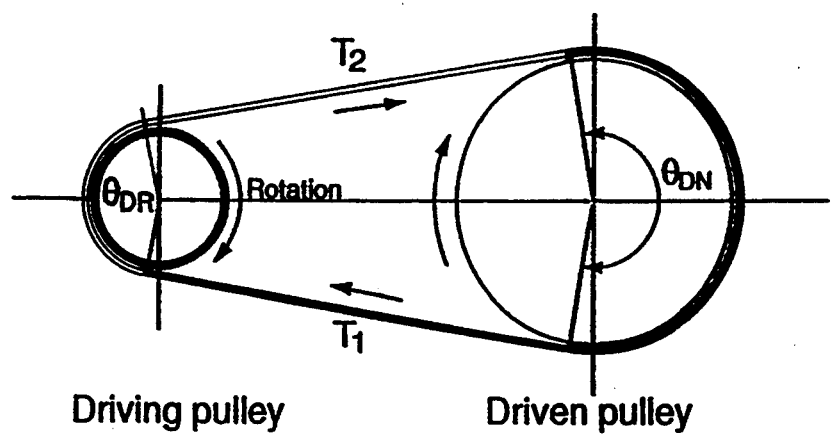
Figure 17:
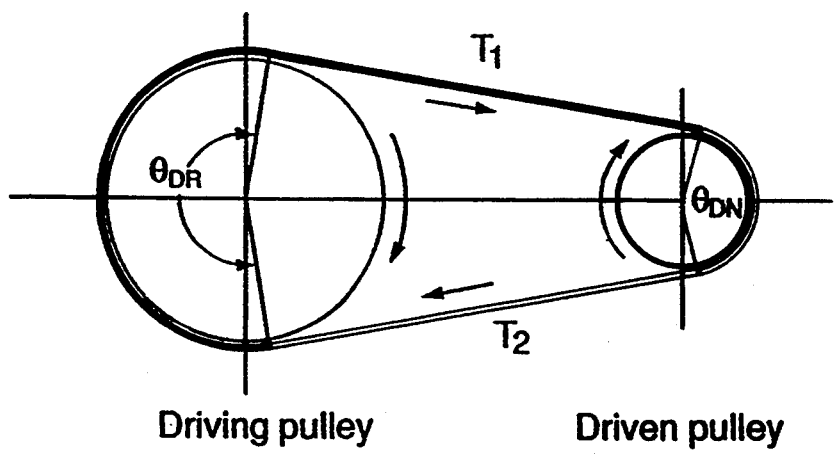

When i>1.0, the saddle speed on the driving pulley is faster than that on the driven pulley. When i<1.0, the saddle speed on the driven pulley is faster than that on the driving pulley. The difference of the speeds is much larger than the predicted value from the elastic slip of the rings. Therefore, the sliding slip must occur between the rings and the blocks on either of the two pulleys. In such a case, it is natural that the sliding slip occurs on a pulley where the total integrated value of the normal force between the rings and the blocks is smaller than the other, i.e., on a pulley of which the contact angle is smaller than the other. Therefore, when i>1.0, sliding slip occurs on the driving pulley (see FIG. 16). Consequently, the ring tension is slack on string [a] to [b] ($T_2$), whereas ring tension is tight on the string [d] to [c] ($T_1$). On the other hand, when i<1.0, sliding slip occurs on the driven pulley (see FIG. 17). Consequently, the ring tension is tight on the string [a] to [b]($T_1$), and the ring tension is slack on the pulley from [d] to [c] ($T_2$). Torque ratio gives no effect on these phenomena. $T_1$ and $T_2$ remain constant and are only affected by the speed ratio. This is also explained by Katsuya. When i>1.0 and at the torque ratio is low, torque is transmitted by the difference in ring tension between $T_1$ and $T_2$. This occurs in spite of the fact that there is no load. This phenomenon is in conflict with the equilibrium condition of external forces. Therefore, block compression force must occur on Side 2. This compression force offsets the transmitted force by the rings, namely $T_1-T_2$. The more torque ratio increases, the more block compression force decreases. As more torque is transmitted, block compression force arises in Side 1.

The conventional theory for power transmitting belts states that the magnitude of tensions $T_1$ and $T_2$ is determined by the magnitude of the arc where the sliding slip occurs. That is $T_1/T_2=\exp(\mu\theta_a)$, where $\theta_a$ is an active are angle and assuming that $T_1>T_2$. In case of metal pushing V-belt, $\theta_a$ is the angle of the contact arc in the small pulley. In the small pulley, the contact are is all active arc. In the large pulley, the contact arc is partly active and partly idle. It is believed that the active arc in the large pulley is identical to the contact arc in small pulley. When i≧1.0, the effective transmitted force ($E^*$) is as follows:

$$\bar{E}=T_2-T_1\pm E \quad (11)$$

When the effective transmitted force ($E^*$) is larger than the ring transmitting force, the block compression force is added to the ring transmitting force, because the block compression force exists on Side 1. When the effective transmitted force is smaller than the ring transmitting force, the block compression force subtracts from the ring transmitting force, because the compression force exits on Side 2.

When i<1.0, the transmitting force ($E^*$) is as follows:

$$\bar{E}=T_2-TW_1+E \quad (11')$$

FIGS. 18–22 show that when i<1.0, the value of thrust ratio ($Q_{DR}/Q_{DN}$) remains unchanged under any torque ratio. On the other hand, when t>1.0, the relation between thrust ratio ($Q_{DR}/Q_{DN}$) and torque ratio (r) is approximately expressed by bi-linear line in half. Predictably, the power transmitting mechanism from pulleys to blocks changes at this breaking point. One of the reasons for this is the change in position of the string where the block compression force exists. Consequently, the transmitting mechanism is affected by speed ratio. As mentioned above, it is necessary that the metal V-belt's behavior to be analyzed in detail.

Figure 25:
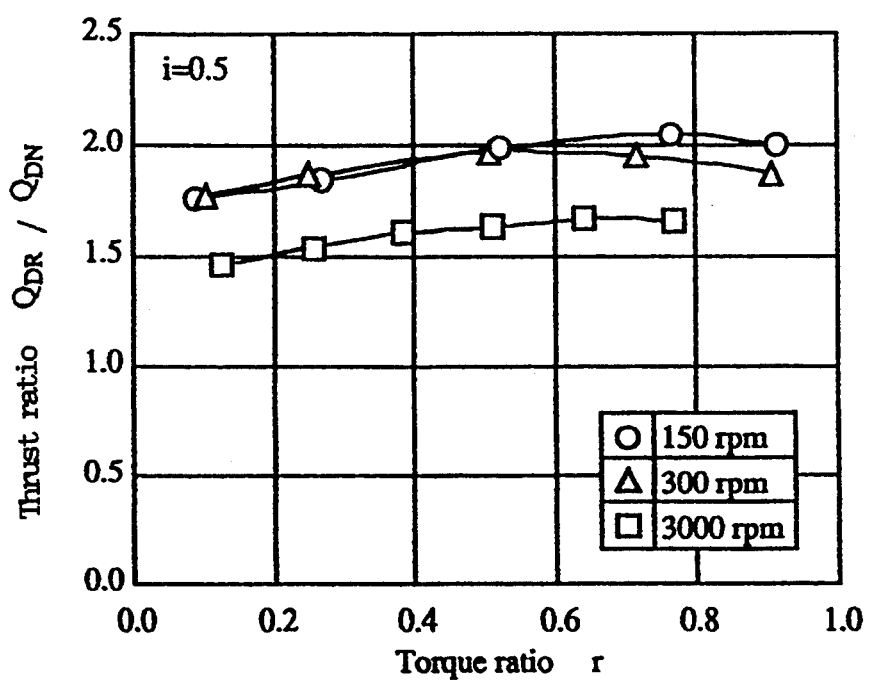
FIG. 25 to 27 are graphs showing the relationship between thrust ratio and torque ration when the rotational speed of a pulley changes.
Figure 26:
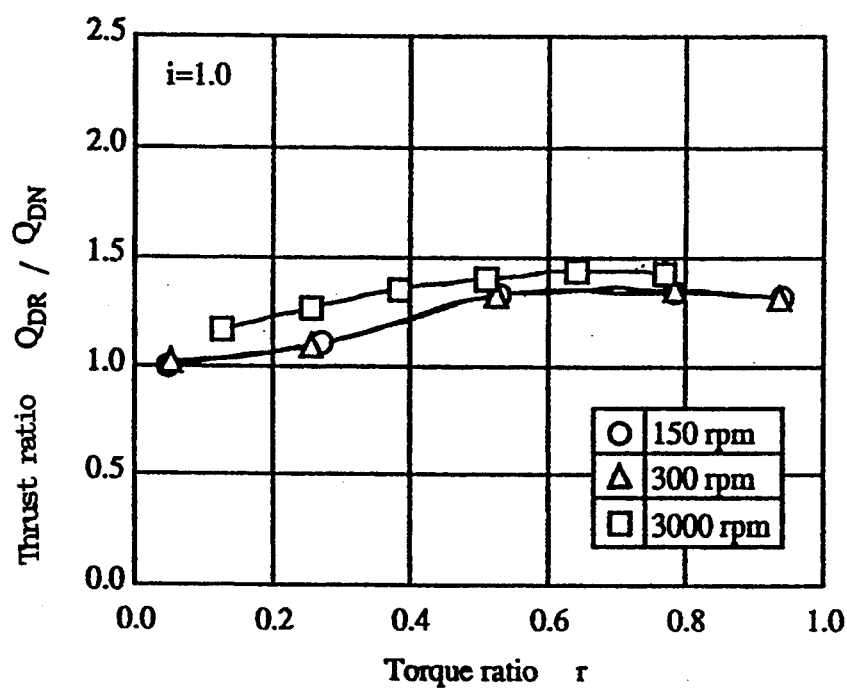
Figure 27:
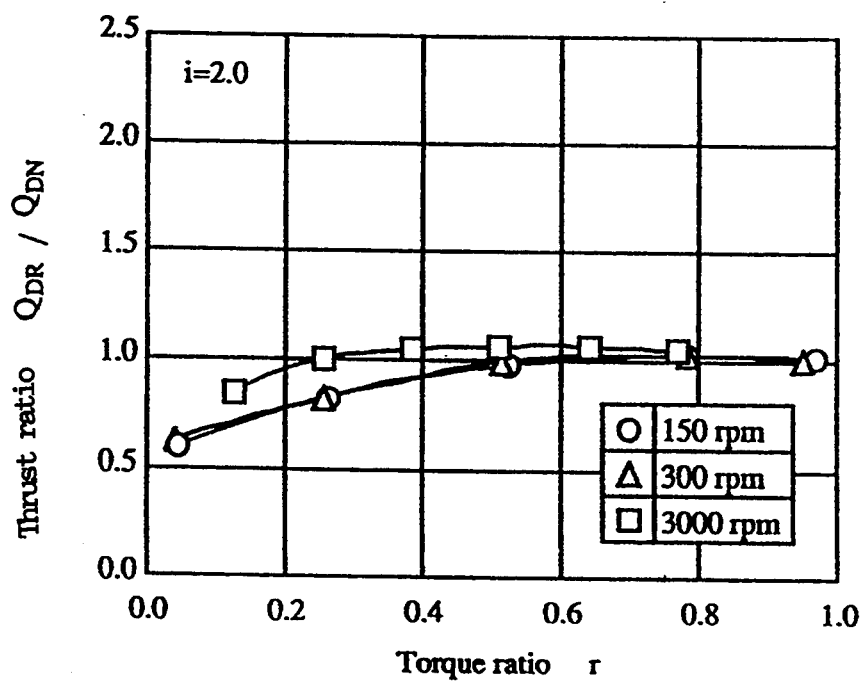

Next, the effect of rotational speed of the pulley on relation between thrust ratio and torque ratio is considered. FIGS. 25–27 show the relation between thrust ratio ($Q_{DR}/Q_{DN}$) and torque ratio (r) when rotational speed of the pulley changes.

The maximum transmittable torque $T_{in}{}^*=38.2\sim 191.1$ Nm. The change in $Q_{DR}/Q_{DN}-r$ is not apparent at low rotational speeds. When i>1.0, and torque ratio is high, thrust ratio is almost independent of rotational speed of the pulley. However, when i=0.5, the effect of rotational speed of the pulley on the relation between thrust ratio and torque ratio is apparent. The thrust ratio at high speed is much smaller than it is at low speed in this case. One possible explanation of this fact is that the coefficient of friction between pulleys and blocks changes according to the change of belt speed.

Figure 28:
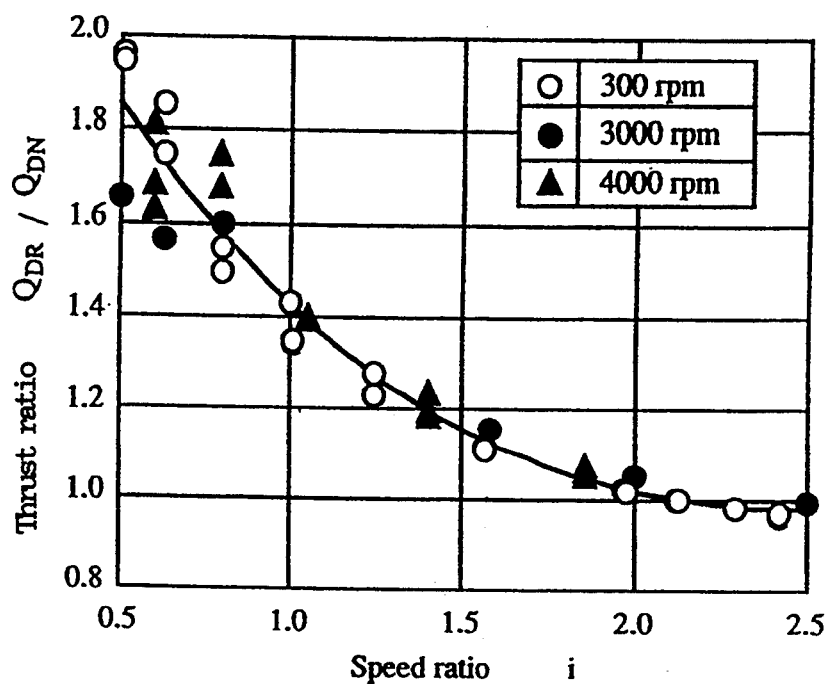
FIG. 28 is a graph showing the relationship between thrust ratio and speed ratio.

FIG. 28 shows the relation between speed ratio (i) and thrust ratio ($Q_{DR}/Q_{DN}$ at r=0.77. When i>0.8, all data almost lie on a curved line. However, when i≦0.8, data scatter becomes large and the difference of thrust ratio between low rotational speeds of the pulley (150, 300 rpm) and high rotational speeds of the pulley (2000, 3000 and 4000 rpm) is apparent. In addition, thrust ratio at high rotational speeds of the pulley seems to be lower than that at low rotational speeds of the pulley.

Relation between thrusts of the driving ($Q_{DR}$) and driven pulleys ($Q_{DN}$) and the coefficient of traction ($\lambda$)

Figure 29:
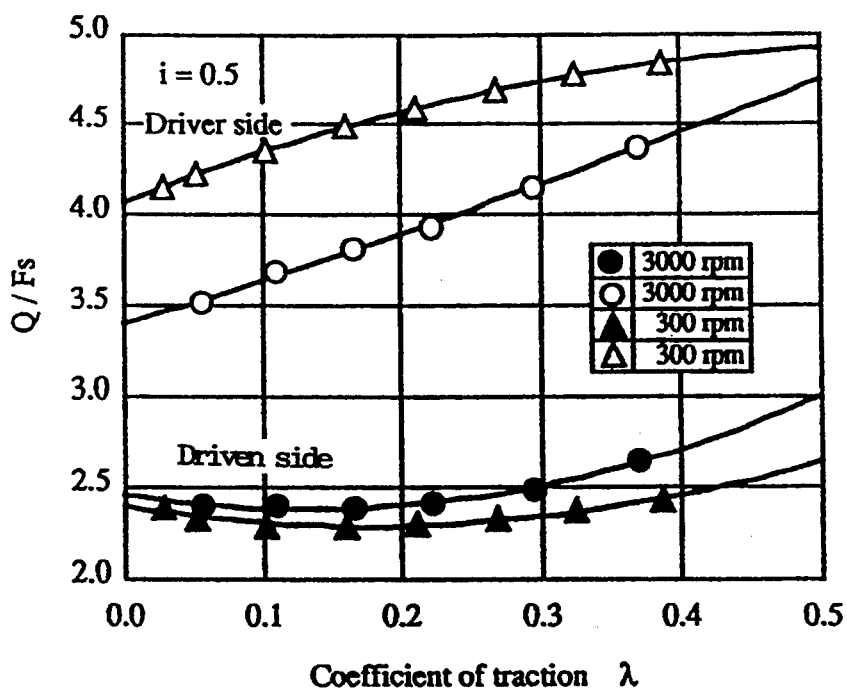
FIGS. 29 to 31 are graphs showing the relationship between the experimental results of non-dimensional thrusts and a coefficient of traction.
Figure 30:
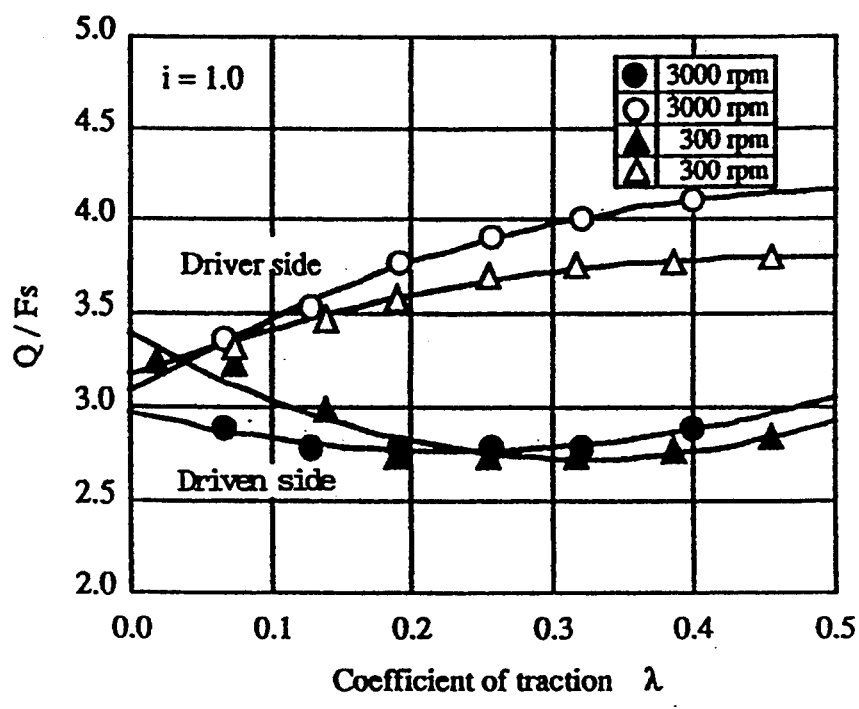
Figure 31:
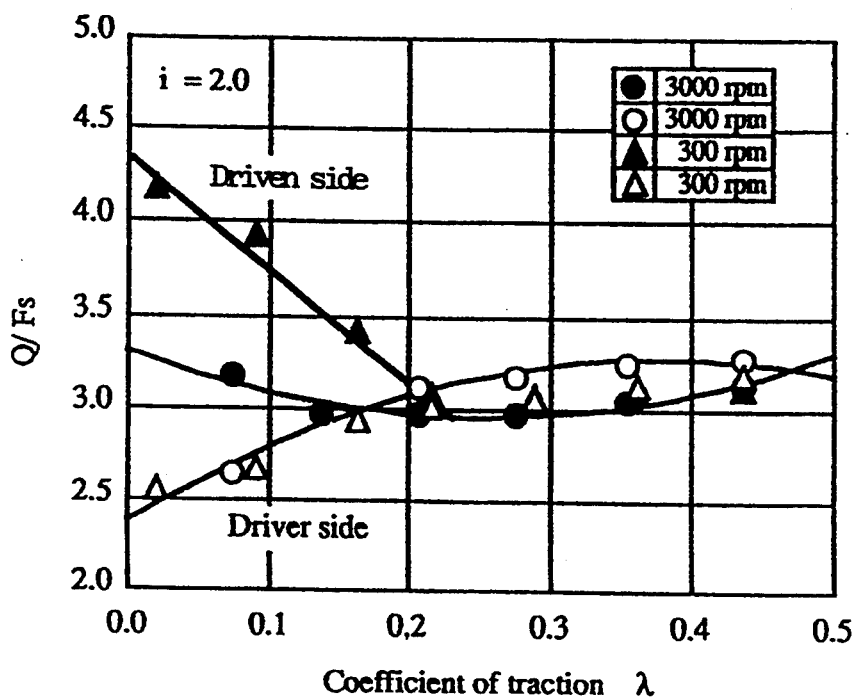
Figure 32:
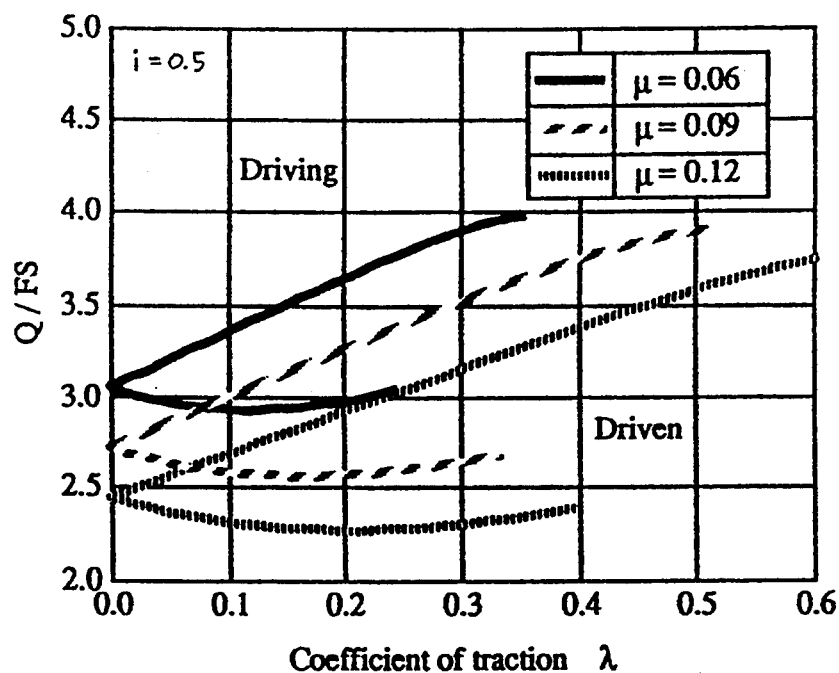
FIGS. 32 to 35 are graphs showing the relationship between the theoretical results for each non-dimensional thrust and a coefficient of traction.
Figure 33:
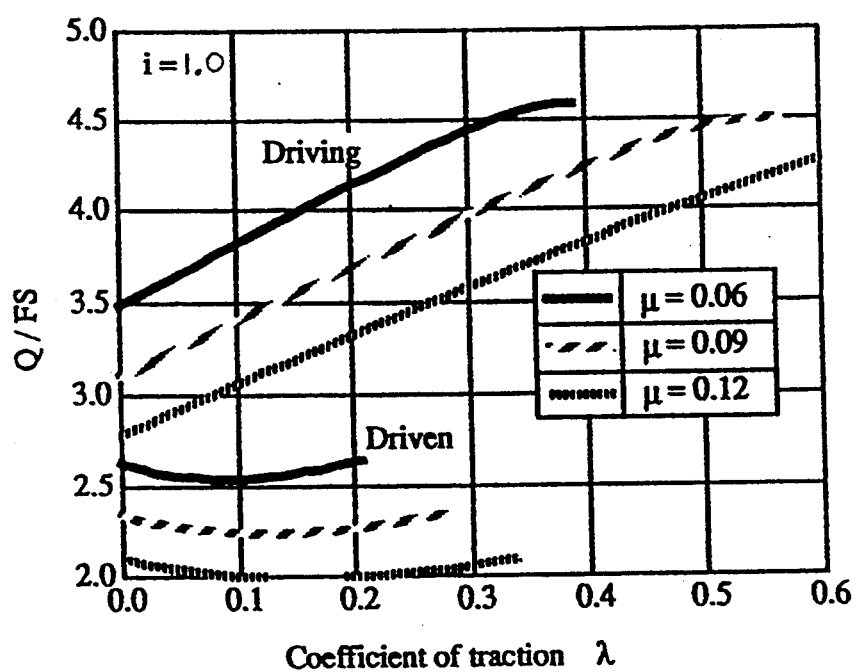
Figure 34:
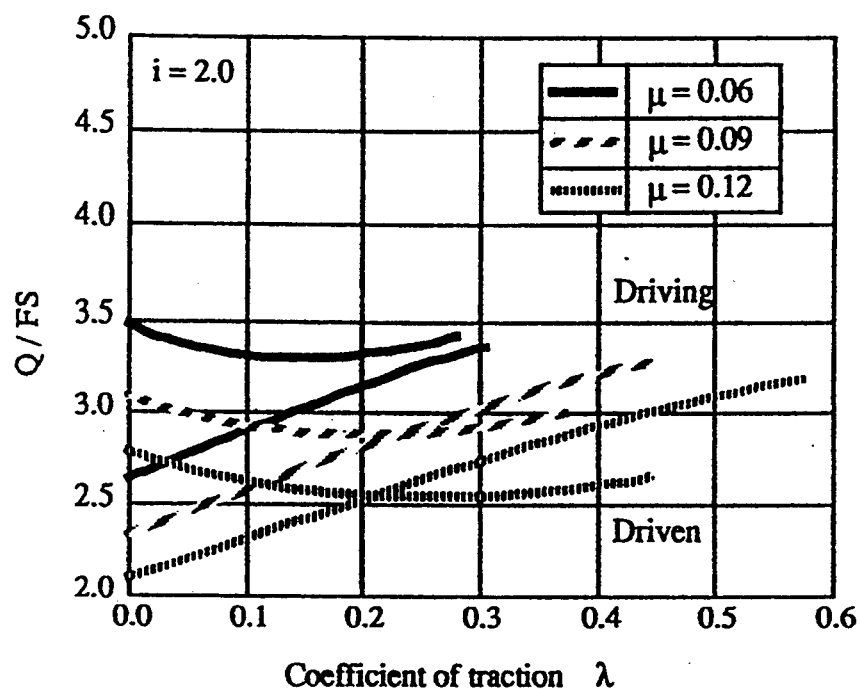

In the field of power transmitting belt research, each pulley thrust sometimes has been estimated based on the coefficient of traction ($\lambda$) of the belt. Gerbert has presented a sophisticated analysis for thrusts of CVT using conventional rubber V-belts. Some empirical and experimental formulae regarding the pulley thrusts exist. Kim and Lee tentatively apply Gerbert's theory to the metal pushing V-belt. They state that Gerbert's theory is consistent with experimental results, as far as the relation between the coefficient of traction ($\lambda$) and non-dimensional thrusts ($Q_{DR}/F_S$, $Q_{DN}/F_S$) is concerned. However, a different coefficient of friction for each pulley has to be chosen. In our research, axial force is measured as well as pulley thrusts. We can examine relation between non-dimensional thrusts ($Q_{DR}/F_S$, $Q_{DN}/F_S$) and coefficient of traction ($\lambda$). FIGS. 29–31 show the experimental results of non-dimensional thrusts ($Q_{DR}/F_S$, $Q_{DN}/F_S$) vs coefficient of traction ($\lambda$) at i=0.5, 1.0 and 2.0.

The rotational speed of the pulley affects these relation more than those shown in FIGS. 25–27. At i=0.5, the non-demensional thrusts on the driving pulley depends on the rotational speed of the pulley. At i=2.0, the non-demensional thrusts on the driven pulley depends on the rotational speed of the pulley. From a viewpoint of controlling the metal pushing V-belt type CVT, thrusts should not be primarily related to the coefficient of traction ($\lambda$). FIGS. 32–35 show the theoretical results for each non-dimensional thrusts ($Q_{DR}/F_S$, $Q_{DN}/F_S$) vs coefficient of traction ($\lambda$).

The following coefficients of friction between a pulley and blocks were used in the calculations in order to compare the theoretical results with the experimental ones. $\mu=0.06$, 0.09 and 0.12 are used in calculation in order to compare the experimental results. The theoretical results were plotted until the magnitude of the driven pulley active arc was equal to the whole of the contact arc, i.e., until sliding slip occurs between a pulley and blocks. The experimental sliding slip occurs on the driven pulley when the coefficient of traction was between 0.39 and 0.45. This range of the coefficient of traction is equal to a torque ratio of 1.0. When i=2.0, the experimental result for the non-dimensional thrusts of driving pulley best fits the theoretical curve for $\mu=0.08$. However, the non-dimensional thrusts of driven pulley follows the theoretical curve for $\mu=0.04$. On the other hand, when i=0.5, the experimental result for the non-dimensional thrusts of the driving pulley best fits the theoretical curve for $\mu_{DR}=0.06$. the non-dimensional thrusts of driven pulley follows the theoretical curve for $\mu_{DN}=0.07$. Therefore, Gerbert's theory or other formulae can not be used practically in their present forms.

BALANCE FORMULA FOR THE PULLEY THRUSTS OF METAL PUSHING V-BELT TYPE CVTs

Figure 35:
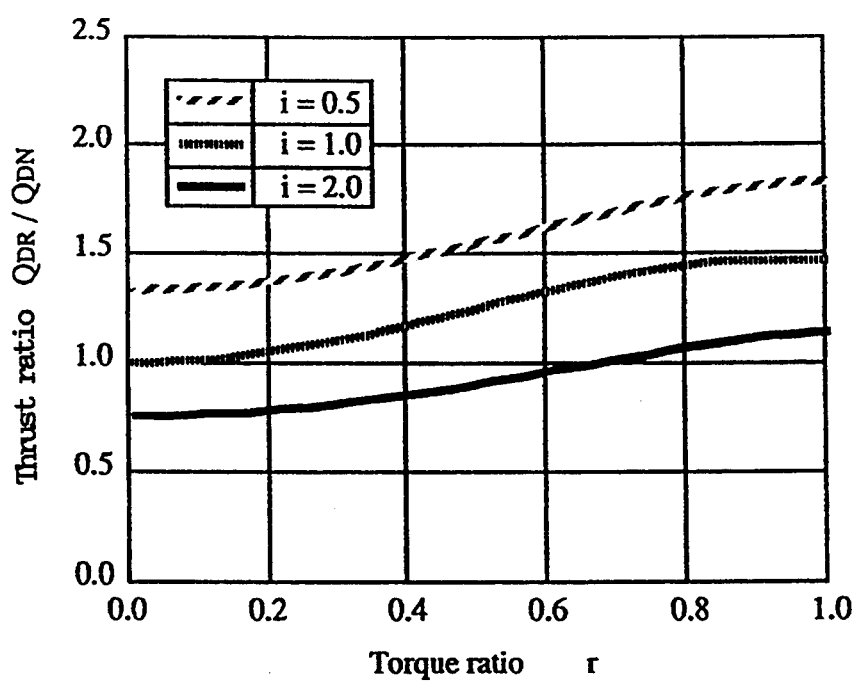

It is possible that Gerbert's theory is used to analyze the behavior of metal pushing V-belts at steady states considering the belt radial motion and the change of sliding angle in the pulley groove. However, since this theory was originally based on the conventional rubber V-belt, some problems must arise if only the final result given by the theory is applied to metal pushing V-belts. After all, the mechanism of metal V-belts differs from the mechanism of conventional pulling V-belts. For example, in metal V-belts, frictional force also acts between the blocks and the rings. FIG. 35 show the relation between thrust ratio ($Q_{DR}/Q_{DN}$) and torque ratio (r).

Figure 36:
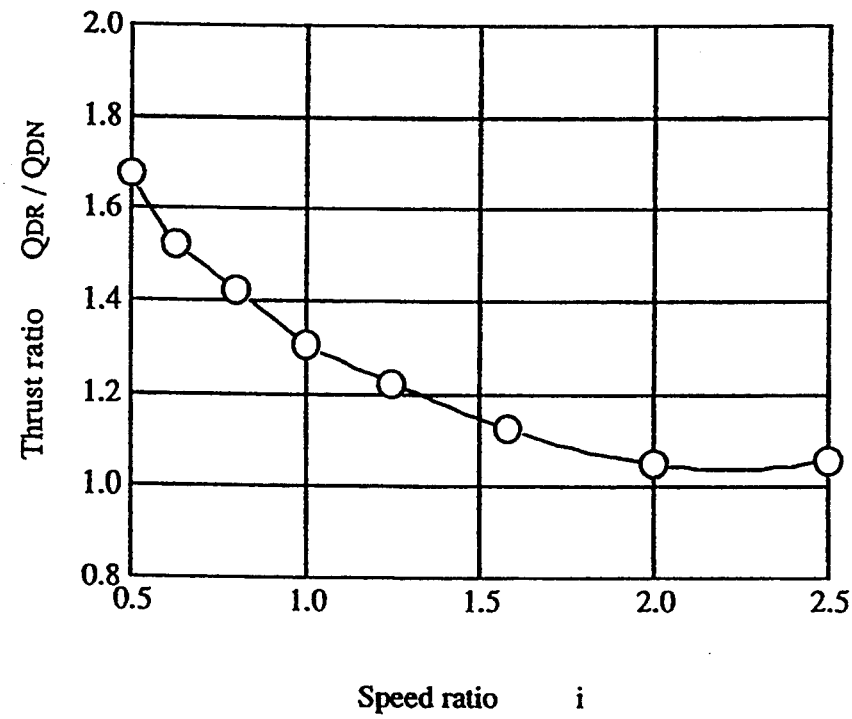
FIG. 36 is a graph showing the relationship between thrust ratio and speed ratio.

When i>1.0, Gerbert's theory is qualitatively consistent with the experimental results. But even if the coefficient of friction is changed, Gerbert's theory cannot agree with the experimental results. The knee point in Gerbert's theory is different from that obtained from the experiments. Furthermore, when i<1.0, it is difficult to assert that Gerbert's theory qualitatively fits the experimental results. However, at r=0.77, the result by Gerbert's theory for the relation between thrust ratio ($Q_{DR}/Q_{DN}$) and speed ratio (i) approximately fits the experimental result as shown in FIG. 36.

When torque ratio is high, it is believed that the transmitted force by way of frictional force between rings and blocks is smaller than the compression force between blocks. If ring tension is constant (i.e. there is no friction between rings and blocks), then Gerbert's theory and other balance formula for thrusts) might rationally be applied to metal pushing V-belts.

The following part of this paper gives a modified equation for thrust balance which can be utilized for metal pushing V-belt type CVTs. This equation is obtained by modification of other known thrust balance formulae. Gerbert's theory gives nonlinear simultaneous differential equations regarding motion of the belt for rubber pulling V-belt type CVT. In order to obtain the relation between thrust and coefficient of traction, these complicated equations must be numerically solved step by step. Therefore, it is difficult to use Gerbert's theory for rapid electronic control of a CVT. Different formulae for thrusts of the two-pulley system have been proposed by Worley and Miloiu. These formulae are primarily based on empirical results. Values obtained from these formulae agree well with the calculated values by Gerbert's theory. The formula for driven thrust proposed by Milolu is:

$$\frac{Q_{DN}}{F_S} = \frac{\cot(\alpha + \rho)(\theta_{DN} - \phi)}{4}(1 - \lambda) + \frac{\cos\alpha}{2\mu}\lambda \quad (12)$$

$$\phi = \frac{\sin\alpha}{\mu} \ln\left(\frac{1 + \lambda}{1 - \lambda}\right)$$

$$\rho = \tan^{-1}\mu$$

The formula for driving thrust proposed by Worley is:

$$\frac{Q_{DR}}{F_S} = \frac{\cot(\alpha + \rho)\theta_{DR}}{4}(1 + \lambda) \quad (13)$$

$$\lambda = \frac{T_{in}}{R_{DR} F_S}$$

For practical control of CVTs, thrust ratio must be ascertained. The thrust ratio depends on the speed ratio, the maximum transmittable torque, and the torque ratio. The relation among these values must be calculated instantaneously for rapid electronic control. When the coefficient of friction is constant (which can be assumed), and for any given speed ratio, $\cot(\alpha+\rho)$, $\theta_{DR}$ and $\theta_{DN}$ in Eq.(12) and (13) are constant. Therefore, Eq.(13) is linear with respect to $\lambda$. However, Eq.(12) is nonlinear with respect to $\lambda$. Accordingly, it is impossible to combine eq.(12) with Eq.(13) to derive an explicit equation for the relation between thrust ratio and speed ratio by eliminating $F_s$ and $\lambda$. In order to obtain such an explicit equation, Eq.(12) must be simplified with respect to $\lambda$.

Figure 37:
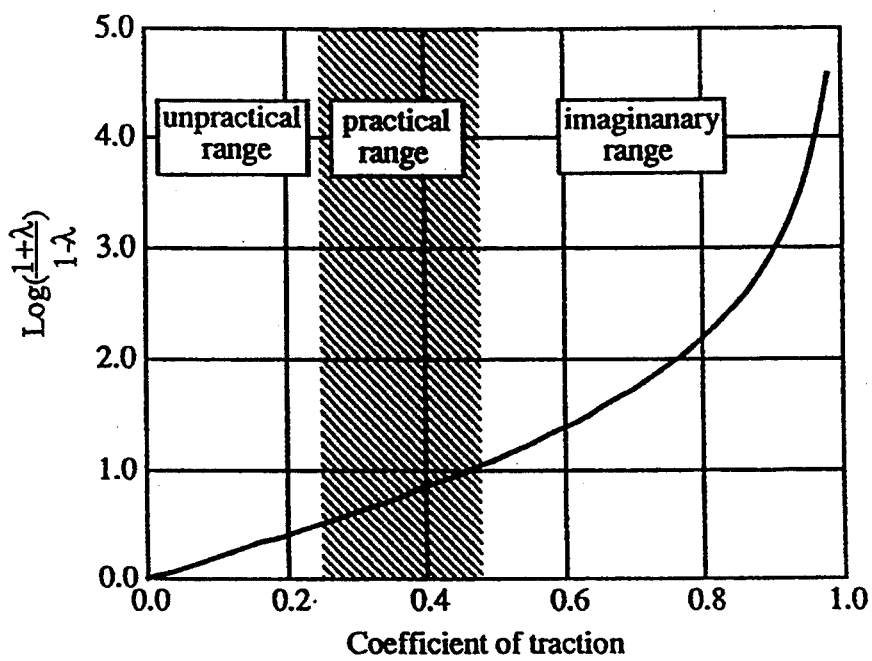
FIGS. 37 and 38 are graphs showing the relationship between algorithm of the coefficient of traction and the coefficient of traction.
Figure 38:
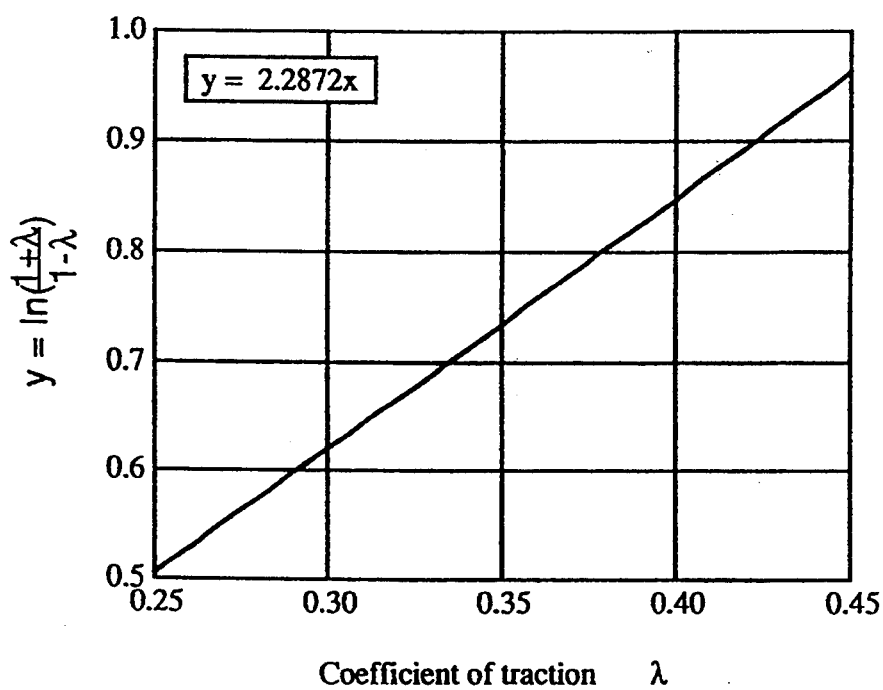
Figure 39:
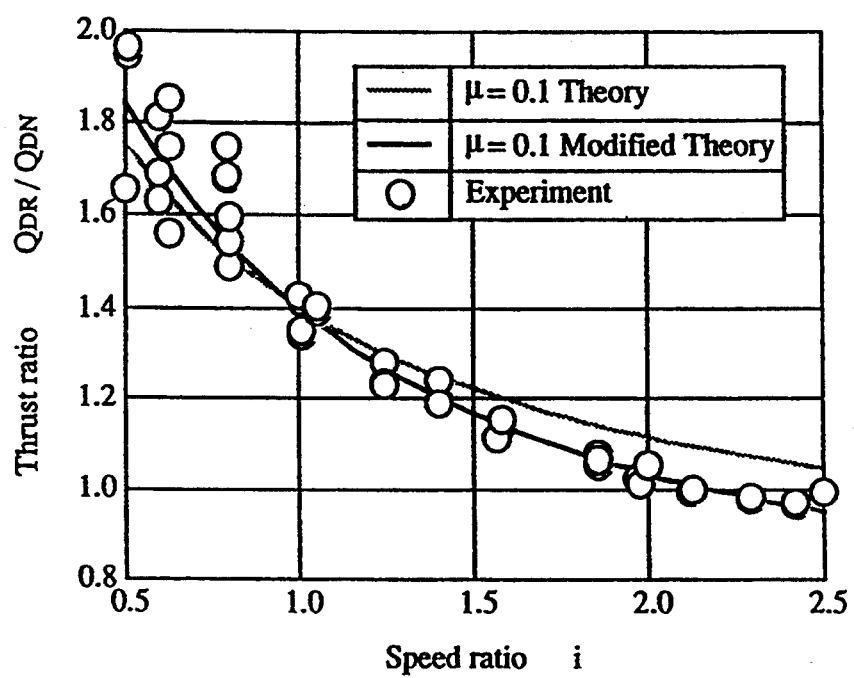
FIG. 39 is a graph showing the relationship between a thrust ratio and a speed ratio.

As regards the term $\psi$ in Eq.(12), FIGS. 37 and 38 show the relation between $$\log\left(\frac{1 + \lambda}{1 - \lambda}\right)$$

and $\lambda$.

From this figure, a nonlinear relation between the two is apparent. However, the practical range of torque ratio is estimated as being $0.5 \leq r \leq 0.9$. Using this range, the coefficient of traction fails within the range $0.25 \leq \lambda \leq 0.45$. For such a narrow range of $\lambda$, the relation between $$\log\left(\frac{1 + \lambda}{1 - \lambda}\right)$$

and $\lambda$ can simplified to a linear relation, and thus the following approximate equation can be obtained:

$$\phi \approx \frac{\sin\alpha}{\mu}(a\lambda + b) \quad (14)$$

Where "a" and "b" are constants.

Therefore, Eq. (12) becomes linear with respect to $\lambda$ as follows:

$$\frac{Q_{DN}}{F_S} = \frac{\cot(\alpha + \rho)\left(Q_{DN} - \frac{\sin \alpha}{\mu}(a\lambda + b)\right)}{4}(1 - \lambda) + \frac{\cos \alpha}{2\mu} \quad (12')$$

Combining Equations (1), (12') and (13) gives a relation between $Q_{DR}/Q_{DN}$ and i in an explicit form as follows:

$$\frac{Q_{DR}}{Q_{DN}} = f(i, r) \quad (15)$$

Using Eq.(15), the relation between $Q_{DR}/Q_{DN}$ and i can be calculated. It is shown by an under-convex curve in FIG. 34, where the coefficient of friction being 0.1(i.e. constant) in every speed ratio is assumed.

Figure 22:
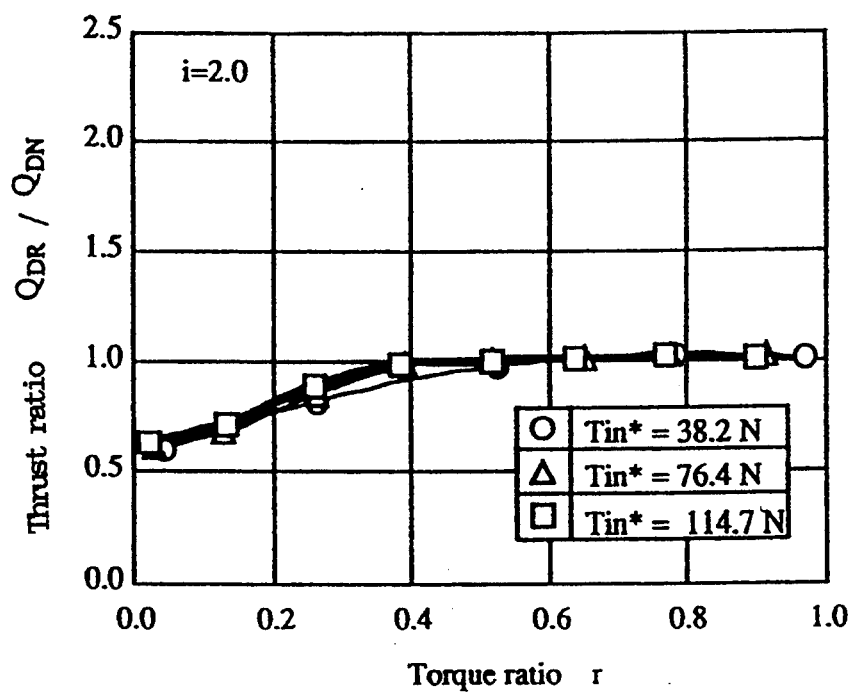

In this FIG. 22, the torque ratio is 0.77(i.e. constant) in every speed ratio. The calculated relation between $Q_{DR}/Q_{DN}$ and i does not coincide with the experimental results. When i<1.0, the calculated $Q_{DR}/Q_{DN}$ values is lower than the experimental value. When i>1.0, the calculated $Q_{DR}/Q_{DN}$ values are higher than the experimental values. When i=1.0, the calculated $Q_{DR}/Q_{DN}$ value are almost the same as the experimental values. If $\mu$ increases higher than 0.1, then $Q_{DR}/Q_{DN}$ increases according to Eq.(15). Similarly, if $\mu$ decreases lower than 0.1, then $Q_{DR}/Q_{DN}$ decreases. In Eq.(15), it is assumed that the entire contact arc on the large pulley is active, Accordingly, $\mu$ is the maximum coefficient of friction ($\mu$) along the entire contact arc. However, the theory of power transmission predicts the existence of an idle arc along part of the contact arc on the large pulley at the entrance. If such an idle arc does not exist, then $\mu$ along this arc would be less than the maximum coefficient of friction. Accordingly, the effective coefficient of friction along the entire contact arc (both idle and active arc) would be less than the maximum coefficient of friction. The effective coefficient of friction is called $\mu'$. It is proposed to introduce $\mu'$ into Eq.(15), to modify this equation. As stated earlier in this paper, it is believed that the active arc in the large pulley identical to the contact arc in the small pulley. In the large pulley $\mu'$ depends upon the ratio of the active arc to the idle arc. According, it is believed that $\mu'$ depends on the ratio of the small pulley contact arc to the large pulley contact arc. Using $\mu'$, when i≦1.0, the coefficient of friction on the driving pulley is $\mu'$, and the coefficient of friction on the driven pulley is $\mu$. Similarity, when i≧1.0, the coefficient of friction on the driving pulley is $\mu$, and the coefficient of friction on the driven pulley is $\mu'$. The relation between $\mu'$ and $\mu$ is as follows:

$$\mu' = \frac{\theta_{DR}(i)}{\pi}\mu \quad i > 1 \quad (16)$$

$$\mu' = \frac{\pi}{\theta_{DN}(i)}\mu \quad i < 1$$

Where, $\theta_{(i=1)}$ is the contact arc on either pulley at $i=1.0(\theta=\pi)$, and $\theta_L(i)$ is the contact arc of the large pulley in every ratio. If $\mu'$ in Eq.(16) is used in Eq.(15), the resultant values are shown by the solid line in FIG. 16. Good coincidence between the calculated values and the experimental results can be seen. This confirm Eq.(16) conbined with Eq.(15) using $\mu'$ well predicts the relation between thrusts ratio and speed ratio. This equation can be used to estimate thrust in metal pushing V-belt type CVT systems.

CONCLUSIONS (1) When the pulley speed ratio i=0.5~2.0, the maximum transmittable torque ($T_{in}^*$) is proportional to the driven pulley thrust ($Q_{DR}/Q_{DN}$).

(2) In every speed ratio, the relation between thrust ratio ($Q_{DR}/Q_{DN}$) and the torque ratio (r) is independent of the maximum transmittable torque ($T_{in}^*$).

(3) When the torque ratio r≧0.4, the thrust ratio is almost constant. When i>1.0, the relation between thrust ratio and torque ratio is expressed by a bi-linear line.

(4) When the pulley speed $N_{in}$=150,300 rpm, the pulley speed has no effect on the relation between thrust ratio and torque ratio. However, when the pulley speed $N_{in}$=2000~4000 rpm, the pulley speed has a small effect on this relation.

When r≧0.5, the relation between thrust ratio and speed ratio is approximately expressed by an under-convex curve. When i≧0.8, the rotational speed of the pulley has little effect on this. The difference of thrust ratio between low pulley speed and high pulley speed is apparent.

(6) Compared to the minimal effect of rotational speed of the pulley on the relation between thrust ratio and torque ratio, the rotational speed of the pulley has much more significant effect on the relation between non-dimensional thrusts and the coefficient of traction ($\lambda$).

(7) Gerbert's theory and other formulae are qualitatively consistent with the experimental results for the relation between pulley thrusts and coefficient of friction, However, the calculated results do not agree with the experimental results quantitatively as long as the same coefficient of friction is used for both pulleys.

(8) A simple equation for thrust balance of metal pushing V-belt type CVTs is proposed in this paper. This equation is based on the formulae for thrust by Miloiu and Worley. the proposed equation well predicts the relation between thrust ratio and speed ratio. This equation can be used to estimate thrusts in metal pushing V-belt type CVT systems.

Although a certain preferred embodiment of the present invention has been shown and described in detail, it should be understood that various changes and modifications may be made therein without departing from the scope of the appended claims.

What is claimed is:

1. A system for controlling a belt-type continuously variable transmission having a drive pulley coupled to an input shaft, a driven pulley coupled to an output shaft, a V-belt trained around the drive and driven pulleys, a drive-pulley cylinder for varying the pulley width of the drive pulley, and a driven-pulley cylinder for varying the pulley width of the driven pulley, said system comprising:

a high-pressure regulator valve for producing high-pressure control oil under a high control pressure;

a low-pressure regulator valve for producing low-pressure control oil under a low control pressure which is lower than said high control pressure;

a shift valve for selectively supplying said high-pressure control oil and said low-pressure control oil to the drive-pulley cylinder and the driven-pulley cylinder; and shift control means for controlling said shift valve to move in a direction to eliminate a difference between a target speed ratio control value and a present speed ratio control value from a reference position in which an axial thrust force ratio between an axial thrust force required to be applied by the drive-pulley cylinder and an axial thrust force required to be applied by the driven-pulley cylinder to keep a present speed ratio i constant.

2. A system according to claim 1, wherein said V-belt comprises a plurality of metallic members connected as an endless ring-shaped belt by a belt strap, whereby each of said metallic members can push an adjacent one of the metallic members to transmit drive forces from the drive pulley to the driven pulley when the drive pulley is rotated by the input shaft.

3. A system according to claim 1, wherein said belt-type continuously variable transmission is mounted on a motor vehicle having an engine coupled to the input shaft and road wheels coupled to the output shaft, for transmitting drive forces from said engine at a variable speed ratio from the input shaft to the output shaft to rotate the road wheels, said system further comprising:

throttle opening detecting means for detecting a throttle opening of the engine;

engine speed detecting means for detecting a rotational speed of the engine; and a vehicle speed detecting means for detecting a vehicle speed of the motor vehicle;

said shift control means comprising means for determining a target engine speed based on the throttle opening detected by said throttle opening detecting means and the vehicle speed detected by said vehicle speed detecting means, said target engine speed being used as said target speed ratio control value, the engine speed detected by said engine speed detecting means being used as said present speed ratio control value.

4. A system according to claim 1, wherein said control means comprises means for determining an axial thrust force ratio required to keep the present speed ratio steadily based on the relationship between speed ratios and axial thrust force ratios under steady condition.

5. A system according to claim 4, wherein said relationship between the speed ratios and the axial thrust force ratios under steady condition is such that insofar as a safety factor is about 1.3, the axial thrust force ratio is about 1.0 when the speed ratio is 2.0, and the axial thrust force ratio is about 1.4 when the speed ratio is 1.0.

6. A system according to claim 1, wherein said low control pressure is determined by:

$$PL = (Sf \times Tin \times \cos \alpha)/(2Rdr \times \mu dn \times Sdn)$$

where
- PL: the low control pressure;
- Sf: the safety factor (which is the margin with respect to the slippage limit and is set to about 1.3);
- Tin: the input shaft torque;
- $\alpha$: the angle at which a pulley surface is inclined;
- Rdr: the radius of a circle around which the belt is trained on the drive pulley;
- $\mu dn$: the coefficient of friction between the driven pulley and the belt; and
- Sdn: the pressure-bearing area of the driven-pulley cylinder.

* * * * *